(12) United States Patent
Jeffery et al.

(10) Patent No.: US 9,155,110 B2
(45) Date of Patent: Oct. 6, 2015

(54) SYSTEM AND METHOD FOR CO-LOCATED AND CO-CHANNEL WI-FI ACCESS POINTS

(71) Applicant: Magnolia Broadband Inc., Englewood, NJ (US)

(72) Inventors: Stuart S. Jeffery, Los Altos, CA (US); Haim Harel, New York, NY (US); Phil F. Chen, Denville, NJ (US); Kenneth Kludt, San Jose, CA (US)

(73) Assignee: Magnolia Broadband Inc., Englewood, NJ (US)

( * ) Notice: Subject to any disclaimer, the term of this patent is extended or adjusted under 35 U.S.C. 154(b) by 0 days.

(21) Appl. No.: 13/925,454

(22) Filed: Jun. 24, 2013

(65) Prior Publication Data

US 2014/0293869 A1 Oct. 2, 2014

Related U.S. Application Data

(60) Provisional application No. 61/805,770, filed on Mar. 27, 2013.

(51) Int. Cl.
*H04B 7/00* (2006.01)
*H04B 7/005* (2006.01)
*H04W 4/00* (2009.01)
*H04W 74/08* (2009.01)

(52) U.S. Cl.
CPC .................................. *H04W 74/0808* (2013.01)

(58) Field of Classification Search
CPC .......... H04W 84/045; H04W 36/0094; H04W 72/042; H04W 48/16; H04W 72/082; H04W 16/06; H04W 24/02; H04W 36/0083; H04W 36/08; H04W 72/06; H04W 88/04; H04W 88/08; H04W 8/005; H04W 28/26; H04W 36/0061; H04W 36/0072; H04W 72/0413; H04W 72/0453; H04W 72/046; H04W 72/048; H04W 72/1231; H04W 74/085; H04W 92/20; H04W 16/04; H04W 16/14; H04W 28/048; H04W 36/0055; H04W 36/0066; H04W 36/30; H04W 40/12; H04W 40/18; H04W 48/02; H04W 48/10; H04W 48/14; H04W 4/06; H04W 4/01; H04W 52/35; H04W 52/00; H04W 74/08; H04W 74/0841; H04W 8/00; H04W 92/12
See application file for complete search history.

(56) References Cited

U.S. PATENT DOCUMENTS 4,044,359 A 8/1977 Applebaum et al.
4,079,318 A 3/1978 Kinoshita
(Continued)

FOREIGN PATENT DOCUMENTS

EP 1 189 303 3/2002
EP 1 867 177 5/2010
(Continued)

OTHER PUBLICATIONS

Office Action issued by the United States Patent and Trademark Office for U.S. Appl. No. 13/630,146 dated Jan. 22, 2013.
(Continued)

*Primary Examiner* — Mounir Moutaouakil
(74) *Attorney, Agent, or Firm* — Pearl Cohen Zedek Latzer Baratz LLP

(57) ABSTRACT

A wireless communication system may include a first transceiver co-located with a second transceiver. The first and second transceivers may be configured to transmit data to at least one user equipment, according to a collision sense multiple access/collision avoidance (CSMA/CA) protocol. A processor may identify data transmission from the second transceiver and allow data transmission from the first transceiver simultaneously with data transmission from the second transceiver, on one frequency.

14 Claims, 12 Drawing Sheets

(56) References Cited

U.S. PATENT DOCUMENTS

| | | | |
|---|---|---|---|
| 4,359,738 | A | 11/1982 | Lewis |
| 4,540,985 | A | 9/1985 | Clancy et al. |
| 4,628,320 | A | 12/1986 | Downie |
| 5,162,805 | A | 11/1992 | Cantrell |
| 5,363,104 | A | 11/1994 | Richmond |
| 5,444,762 | A | 8/1995 | Frey et al. |
| 5,732,075 | A | 3/1998 | Tangemann et al. |
| 5,915,215 | A * | 6/1999 | Williams et al. ........... 455/422.1 |
| 5,936,577 | A | 8/1999 | Shoki et al. |
| 5,940,033 | A | 8/1999 | Locher et al. |
| 6,018,317 | A | 1/2000 | Dogan et al. |
| 6,026,081 | A | 2/2000 | Hamabe |
| 6,046,655 | A | 4/2000 | Cipolla |
| 6,094,165 | A | 7/2000 | Smith |
| 6,101,399 | A | 8/2000 | Raleigh et al. |
| 6,163,695 | A | 12/2000 | Takemura |
| 6,167,286 | A | 12/2000 | Ward et al. |
| 6,215,812 | B1 | 4/2001 | Young et al. |
| 6,226,507 | B1 | 5/2001 | Ramesh et al. |
| 6,230,123 | B1 | 5/2001 | Mekuria et al. |
| 6,259,683 | B1 | 7/2001 | Sekine et al. |
| 6,297,772 | B1 | 10/2001 | Lewis |
| 6,321,077 | B1 | 11/2001 | Saitoh et al. |
| 6,335,953 | B1 | 1/2002 | Sanderford et al. |
| 6,370,378 | B1 | 4/2002 | Yahagi |
| 6,377,783 | B1 | 4/2002 | Lo et al. |
| 6,393,282 | B1 | 5/2002 | Iimori |
| 6,584,115 | B1 | 6/2003 | Suzuki |
| 6,647,276 | B1 | 11/2003 | Kuwahara et al. |
| 6,697,622 | B1 | 2/2004 | Ishikawa et al. |
| 6,697,633 | B1 | 2/2004 | Dogan et al. |
| 6,735,182 | B1 | 5/2004 | Nishimori et al. |
| 6,834,073 | B1 | 12/2004 | Miller et al. |
| 6,842,460 | B1 | 1/2005 | Olkkonen et al. |
| 6,914,890 | B1 | 7/2005 | Tobita et al. |
| 6,927,646 | B2 | 8/2005 | Niemi |
| 6,934,541 | B2 | 8/2005 | Miyatani |
| 6,975,582 | B1 | 12/2005 | Karabinis et al. |
| 6,987,958 | B1 | 1/2006 | Lo et al. |
| 7,068,628 | B2 | 6/2006 | Li et al. |
| 7,154,960 | B2 | 12/2006 | Liu et al. |
| 7,177,663 | B2 | 2/2007 | Axness et al. |
| 7,190,964 | B2 | 3/2007 | Damnjanovic et al. |
| 7,257,425 | B2 | 8/2007 | Wang et al. |
| 7,299,072 | B2 | 11/2007 | Ninomiya |
| 7,391,757 | B2 | 6/2008 | Haddad et al. |
| 7,392,015 | B1 | 6/2008 | Farlow et al. |
| 7,474,676 | B2 | 1/2009 | Tao et al. |
| 7,499,109 | B2 | 3/2009 | Kim et al. |
| 7,512,083 | B2 | 3/2009 | Li |
| 7,606,528 | B2 | 10/2009 | Mesecher |
| 7,634,015 | B2 | 12/2009 | Waxman |
| 7,646,744 | B2 | 1/2010 | Li |
| 7,719,993 | B2 | 5/2010 | Li et al. |
| 7,742,000 | B2 | 6/2010 | Mohamadi |
| 7,769,107 | B2 | 8/2010 | Sandhu et al. |
| 7,876,848 | B2 | 1/2011 | Han et al. |
| 7,881,401 | B2 | 2/2011 | Kraut et al. |
| 7,898,478 | B2 | 3/2011 | Niu et al. |
| 7,904,086 | B2 | 3/2011 | Kundu et al. |
| 7,904,106 | B2 | 3/2011 | Han et al. |
| 7,933,255 | B2 | 4/2011 | Li |
| 7,970,366 | B2 | 6/2011 | Arita et al. |
| 8,078,109 | B1 | 12/2011 | Mulcay |
| 8,103,284 | B2 | 1/2012 | Mueckenheim et al. |
| 8,111,782 | B2 | 2/2012 | Kim et al. |
| 8,115,679 | B2 | 2/2012 | Falk |
| 8,155,613 | B2 | 4/2012 | Kent et al. |
| 8,194,602 | B2 | 6/2012 | Van Rensburg et al. |
| 8,275,377 | B2 | 9/2012 | Nanda et al. |
| 8,280,443 | B2 | 10/2012 | Tao et al. |
| 8,294,625 | B2 | 10/2012 | Kittinger et al. |
| 8,306,012 | B2 * | 11/2012 | Lindoff et al. ................. 370/350 |
| 8,315,671 | B2 | 11/2012 | Kuwahara et al. |
| 8,369,436 | B2 | 2/2013 | Stirling-Gallacher |
| 8,504,098 | B2 | 8/2013 | Khojastepour |
| 8,509,190 | B2 | 8/2013 | Rofougaran |
| 8,520,657 | B2 * | 8/2013 | Rofougaran .................. 370/344 |
| 8,526,886 | B2 | 9/2013 | Wu et al. |
| 8,571,127 | B2 | 10/2013 | Jiang et al. |
| 8,588,844 | B2 | 11/2013 | Shpak |
| 8,599,955 | B1 | 12/2013 | Kludt et al. |
| 8,599,979 | B2 | 12/2013 | Farag et al. |
| 8,605,658 | B2 | 12/2013 | Fujimoto |
| 8,611,288 | B1 | 12/2013 | Zhang et al. |
| 8,644,413 | B2 | 2/2014 | Harel et al. |
| 8,649,458 | B2 | 2/2014 | Kludt et al. |
| 8,666,319 | B2 | 3/2014 | Kloper et al. |
| 8,670,504 | B2 | 3/2014 | Naguib |
| 8,744,511 | B2 | 6/2014 | Jones et al. |
| 8,754,810 | B2 | 6/2014 | Guo et al. |
| 8,767,862 | B2 | 7/2014 | Abreu et al. |
| 8,780,743 | B2 | 7/2014 | Sombrutzki et al. |
| 8,797,969 | B1 | 8/2014 | Harel et al. |
| 8,891,598 | B1 | 11/2014 | Wang et al. |
| 8,976,845 | B2 | 3/2015 | O'Keeffe et al. |
| 9,014,066 | B1 | 4/2015 | Wang et al. |
| 9,035,828 | B2 | 5/2015 | O'Keeffe et al. |
| 2001/0029326 | A1 | 10/2001 | Diab et al. |
| 2001/0038665 | A1 | 11/2001 | Baltersee et al. |
| 2002/0024975 | A1 | 2/2002 | Hendler |
| 2002/0051430 | A1 | 5/2002 | Kasami et al. |
| 2002/0065107 | A1 | 5/2002 | Harel et al. |
| 2002/0085643 | A1 | 7/2002 | Kitchener et al. |
| 2002/0107013 | A1 | 8/2002 | Fitzgerald |
| 2002/0115474 | A1 | 8/2002 | Yoshino et al. |
| 2002/0181426 | A1 | 12/2002 | Sherman |
| 2002/0181437 | A1 | 12/2002 | Ohkubo et al. |
| 2003/0087645 | A1 | 5/2003 | Kim et al. |
| 2003/0114162 | A1 | 6/2003 | Chheda et al. |
| 2003/0153322 | A1 | 8/2003 | Burke et al. |
| 2003/0153360 | A1 | 8/2003 | Burke et al. |
| 2003/0186653 | A1 | 10/2003 | Mohebbi et al. |
| 2003/0203717 | A1 | 10/2003 | Chuprun et al. |
| 2003/0203743 | A1 | 10/2003 | Sugar et al. |
| 2004/0023693 | A1 | 2/2004 | Okawa et al. |
| 2004/0056795 | A1 | 3/2004 | Ericson et al. |
| 2004/0063455 | A1 | 4/2004 | Eran et al. |
| 2004/0081144 | A1 | 4/2004 | Martin et al. |
| 2004/0121810 | A1 | 6/2004 | Goransson et al. |
| 2004/0125899 | A1 | 7/2004 | Li et al. |
| 2004/0125900 | A1 | 7/2004 | Liu et al. |
| 2004/0142696 | A1 | 7/2004 | Saunders et al. |
| 2004/0147266 | A1 | 7/2004 | Hwang et al. |
| 2004/0156399 | A1 | 8/2004 | Eran |
| 2004/0166902 | A1 | 8/2004 | Castellano et al. |
| 2004/0198292 | A1 | 10/2004 | Smith et al. |
| 2004/0228388 | A1 | 11/2004 | Salmenkaita |
| 2004/0235527 | A1 | 11/2004 | Reudink et al. |
| 2004/0264504 | A1 | 12/2004 | Jin |
| 2005/0068230 | A1 | 3/2005 | Munoz et al. |
| 2005/0068918 | A1 | 3/2005 | Mantravadi et al. |
| 2005/0075140 | A1 | 4/2005 | Famolari |
| 2005/0085266 | A1 | 4/2005 | Narita |
| 2005/0129155 | A1 | 6/2005 | Hoshino |
| 2005/0147023 | A1 | 7/2005 | Stephens et al. |
| 2005/0163097 | A1 | 7/2005 | Do et al. |
| 2005/0245224 | A1 | 11/2005 | Kurioka |
| 2005/0250544 | A1 | 11/2005 | Grant et al. |
| 2005/0254513 | A1 | 11/2005 | Cave et al. |
| 2005/0265436 | A1 | 12/2005 | Suh et al. |
| 2005/0286440 | A1 | 12/2005 | Strutt et al. |
| 2005/0287962 | A1 | 12/2005 | Mehta et al. |
| 2006/0041676 | A1 | 2/2006 | Sherman |
| 2006/0092889 | A1 | 5/2006 | Lyons et al. |
| 2006/0094372 | A1 | 5/2006 | Ahn et al. |
| 2006/0098605 | A1 | 5/2006 | Li |
| 2006/0111149 | A1 | 5/2006 | Chitrapu et al. |
| 2006/0135097 | A1 | 6/2006 | Wang et al. |
| 2006/0183503 | A1 | 8/2006 | Goldberg |
| 2006/0203850 | A1 | 9/2006 | Johnson et al. |
| 2006/0227854 | A1 | 10/2006 | McCloud et al. |
| 2006/0264184 | A1 | 11/2006 | Li et al. |
| 2006/0270343 | A1 | 11/2006 | Cha et al. |

(56) References Cited

U.S. PATENT DOCUMENTS

| | | | |
|---|---|---|---|
| 2006/0271969 A1 | 11/2006 | Takizawa et al. | |
| 2006/0285507 A1 | 12/2006 | Kinder et al. | |
| 2007/0041398 A1 | 2/2007 | Benveniste | |
| 2007/0058581 A1 | 3/2007 | Benveniste | |
| 2007/0076675 A1 | 4/2007 | Chen | |
| 2007/0093261 A1 | 4/2007 | Hou et al. | |
| 2007/0097918 A1 | 5/2007 | Cai et al. | |
| 2007/0115882 A1 | 5/2007 | Wentink | |
| 2007/0115914 A1 | 5/2007 | Ohkubo et al. | |
| 2007/0152903 A1 | 7/2007 | Lin et al. | |
| 2007/0217352 A1 | 9/2007 | Kwon | |
| 2007/0223380 A1 | 9/2007 | Gilbert et al. | |
| 2007/0249386 A1 | 10/2007 | Bennett | |
| 2007/0298742 A1 | 12/2007 | Ketchum et al. | |
| 2008/0043867 A1 | 2/2008 | Blanz et al. | |
| 2008/0051037 A1 | 2/2008 | Molnar et al. | |
| 2008/0081671 A1 | 4/2008 | Wang et al. | |
| 2008/0095163 A1 | 4/2008 | Chen et al. | |
| 2008/0108352 A1 | 5/2008 | Montemurro et al. | |
| 2008/0144737 A1* | 6/2008 | Naguib | 375/299 |
| 2008/0165732 A1 | 7/2008 | Kim et al. | |
| 2008/0238808 A1 | 10/2008 | Arita et al. | |
| 2008/0240314 A1 | 10/2008 | Gaal et al. | |
| 2008/0247370 A1 | 10/2008 | Gu et al. | |
| 2008/0267142 A1 | 10/2008 | Mushkin et al. | |
| 2008/0280571 A1 | 11/2008 | Rofougaran et al. | |
| 2008/0285637 A1 | 11/2008 | Liu et al. | |
| 2009/0003299 A1 | 1/2009 | Cave et al. | |
| 2009/0028225 A1 | 1/2009 | Runyon et al. | |
| 2009/0046638 A1 | 2/2009 | Rappaport et al. | |
| 2009/0058724 A1 | 3/2009 | Xia et al. | |
| 2009/0121935 A1 | 5/2009 | Xia et al. | |
| 2009/0137206 A1 | 5/2009 | Sherman et al. | |
| 2009/0154419 A1 | 6/2009 | Yoshida et al. | |
| 2009/0187661 A1 | 7/2009 | Sherman | |
| 2009/0190541 A1 | 7/2009 | Abedi | |
| 2009/0227255 A1 | 9/2009 | Thakare | |
| 2009/0239486 A1 | 9/2009 | Sugar et al. | |
| 2009/0268616 A1 | 10/2009 | Hosomi | |
| 2009/0285331 A1 | 11/2009 | Sugar et al. | |
| 2009/0322610 A1 | 12/2009 | Hants et al. | |
| 2009/0322613 A1 | 12/2009 | Bala et al. | |
| 2009/0323608 A1 | 12/2009 | Adachi et al. | |
| 2010/0002656 A1 | 1/2010 | Ji et al. | |
| 2010/0037111 A1 | 2/2010 | Ziaja et al. | |
| 2010/0040369 A1* | 2/2010 | Zhao et al. | 398/58 |
| 2010/0067473 A1 | 3/2010 | Cave et al. | |
| 2010/0087227 A1 | 4/2010 | Francos et al. | |
| 2010/0111039 A1 | 5/2010 | Kim et al. | |
| 2010/0117890 A1 | 5/2010 | Vook et al. | |
| 2010/0135420 A1 | 6/2010 | Xu et al. | |
| 2010/0150013 A1 | 6/2010 | Hara et al. | |
| 2010/0172429 A1 | 7/2010 | Nagahama et al. | |
| 2010/0195560 A1* | 8/2010 | Nozaki et al. | 370/315 |
| 2010/0195601 A1 | 8/2010 | Zhang | |
| 2010/0208712 A1 | 8/2010 | Wax et al. | |
| 2010/0222011 A1 | 9/2010 | Behzad | |
| 2010/0232355 A1 | 9/2010 | Richeson et al. | |
| 2010/0234071 A1 | 9/2010 | Shabtay et al. | |
| 2010/0278063 A1* | 11/2010 | Kim et al. | 370/252 |
| 2010/0283692 A1 | 11/2010 | Achour et al. | |
| 2010/0285752 A1 | 11/2010 | Lakshmanan et al. | |
| 2010/0291931 A1 | 11/2010 | Suemitsu et al. | |
| 2010/0303170 A1 | 12/2010 | Zhu et al. | |
| 2010/0316043 A1* | 12/2010 | Doi et al. | 370/350 |
| 2011/0019639 A1 | 1/2011 | Karaoguz et al. | |
| 2011/0032849 A1* | 2/2011 | Yeung et al. | 370/280 |
| 2011/0032972 A1 | 2/2011 | Wang et al. | |
| 2011/0085465 A1 | 4/2011 | Lindoff et al. | |
| 2011/0085532 A1 | 4/2011 | Scherzer et al. | |
| 2011/0105036 A1 | 5/2011 | Rao et al. | |
| 2011/0116489 A1 | 5/2011 | Grandhi | |
| 2011/0134816 A1 | 6/2011 | Liu et al. | |
| 2011/0150050 A1 | 6/2011 | Trigui et al. | |
| 2011/0150066 A1 | 6/2011 | Fujimoto | |
| 2011/0151826 A1 | 6/2011 | Miller et al. | |
| 2011/0163913 A1 | 7/2011 | Cohen et al. | |
| 2011/0205883 A1 | 8/2011 | Mihota | |
| 2011/0205998 A1 | 8/2011 | Hart et al. | |
| 2011/0228742 A1 | 9/2011 | Honkasalo et al. | |
| 2011/0249576 A1 | 10/2011 | Chrisikos et al. | |
| 2011/0250884 A1 | 10/2011 | Brunel et al. | |
| 2011/0273977 A1 | 11/2011 | Shapira et al. | |
| 2011/0281541 A1 | 11/2011 | Borremans | |
| 2011/0299437 A1 | 12/2011 | Mikhemar et al. | |
| 2011/0310827 A1 | 12/2011 | Srinivasa et al. | |
| 2011/0310853 A1 | 12/2011 | Yin et al. | |
| 2012/0014377 A1* | 1/2012 | Joergensen et al. | 370/352 |
| 2012/0015603 A1 | 1/2012 | Proctor et al. | |
| 2012/0020396 A1 | 1/2012 | Hohne et al. | |
| 2012/0027000 A1 | 2/2012 | Wentink | |
| 2012/0028638 A1 | 2/2012 | Mueck et al. | |
| 2012/0028655 A1 | 2/2012 | Mueck et al. | |
| 2012/0028671 A1 | 2/2012 | Niu et al. | |
| 2012/0033761 A1 | 2/2012 | Guo et al. | |
| 2012/0034952 A1 | 2/2012 | Lo et al. | |
| 2012/0045003 A1 | 2/2012 | Li et al. | |
| 2012/0051287 A1 | 3/2012 | Merlin et al. | |
| 2012/0064838 A1* | 3/2012 | Miao et al. | 455/73 |
| 2012/0069828 A1 | 3/2012 | Taki et al. | |
| 2012/0076028 A1 | 3/2012 | Ko et al. | |
| 2012/0076229 A1 | 3/2012 | Brobston et al. | |
| 2012/0088512 A1 | 4/2012 | Yamada et al. | |
| 2012/0092217 A1 | 4/2012 | Hosoya et al. | |
| 2012/0100802 A1 | 4/2012 | Mohebbi | |
| 2012/0115523 A1 | 5/2012 | Shpak | |
| 2012/0155349 A1 | 6/2012 | Bajic et al. | |
| 2012/0155397 A1 | 6/2012 | Shaffer et al. | |
| 2012/0163257 A1 | 6/2012 | Kim et al. | |
| 2012/0163302 A1 | 6/2012 | Takano | |
| 2012/0170453 A1 | 7/2012 | Tiwari | |
| 2012/0170672 A1 | 7/2012 | Sondur | |
| 2012/0201153 A1 | 8/2012 | Bharadia et al. | |
| 2012/0201173 A1 | 8/2012 | Jain et al. | |
| 2012/0207256 A1 | 8/2012 | Farag et al. | |
| 2012/0212372 A1 | 8/2012 | Petersson et al. | |
| 2012/0213065 A1 | 8/2012 | Koo et al. | |
| 2012/0218962 A1 | 8/2012 | Kishiyama et al. | |
| 2012/0220331 A1 | 8/2012 | Luo et al. | |
| 2012/0230380 A1 | 9/2012 | Keusgen et al. | |
| 2012/0251031 A1 | 10/2012 | Suarez et al. | |
| 2012/0270531 A1 | 10/2012 | Wright et al. | |
| 2012/0270544 A1 | 10/2012 | Shah | |
| 2012/0281598 A1 | 11/2012 | Struhsaker et al. | |
| 2012/0314570 A1 | 12/2012 | Forenza et al. | |
| 2012/0321015 A1 | 12/2012 | Hansen et al. | |
| 2012/0327870 A1 | 12/2012 | Grandhi et al. | |
| 2013/0010623 A1 | 1/2013 | Golitschek | |
| 2013/0012134 A1 | 1/2013 | Jin et al. | |
| 2013/0017794 A1 | 1/2013 | Kloper et al. | |
| 2013/0023225 A1 | 1/2013 | Weber | |
| 2013/0044877 A1 | 2/2013 | Liu et al. | |
| 2013/0051283 A1 | 2/2013 | Lee et al. | |
| 2013/0058239 A1 | 3/2013 | Wang et al. | |
| 2013/0070741 A1 | 3/2013 | Li et al. | |
| 2013/0079048 A1* | 3/2013 | Cai et al. | 455/517 |
| 2013/0094437 A1 | 4/2013 | Bhattacharya | |
| 2013/0094621 A1 | 4/2013 | Luo et al. | |
| 2013/0095780 A1 | 4/2013 | Prazan et al. | |
| 2013/0101073 A1 | 4/2013 | Zai et al. | |
| 2013/0150012 A1 | 6/2013 | Chhabra et al. | |
| 2013/0156016 A1 | 6/2013 | Debnath et al. | |
| 2013/0156120 A1 | 6/2013 | Josiam et al. | |
| 2013/0172029 A1 | 7/2013 | Chang et al. | |
| 2013/0190006 A1 | 7/2013 | Kazmi et al. | |
| 2013/0208587 A1 | 8/2013 | Bala et al. | |
| 2013/0208619 A1* | 8/2013 | Kudo et al. | 370/252 |
| 2013/0223400 A1* | 8/2013 | Seo et al. | 370/329 |
| 2013/0229996 A1 | 9/2013 | Wang et al. | |
| 2013/0229999 A1 | 9/2013 | Da Silva et al. | |
| 2013/0235720 A1 | 9/2013 | Wang et al. | |
| 2013/0242853 A1 | 9/2013 | Seo et al. | |
| 2013/0242899 A1 | 9/2013 | Lysejko et al. | |
| 2013/0242965 A1 | 9/2013 | Horn et al. | |

(56) References Cited

U.S. PATENT DOCUMENTS

| | | | |
|---|---|---|---|
| 2013/0242976 A1* | 9/2013 | Katayama et al. | 370/350 |
| 2013/0252621 A1 | 9/2013 | Dimou et al. | |
| 2013/0272437 A1 | 10/2013 | Eidson et al. | |
| 2013/0301551 A1 | 11/2013 | Ghosh et al. | |
| 2013/0331136 A1 | 12/2013 | Yang et al. | |
| 2013/0343369 A1 | 12/2013 | Yamaura | |
| 2014/0010089 A1 | 1/2014 | Cai et al. | |
| 2014/0010211 A1 | 1/2014 | Asterjadhi et al. | |
| 2014/0029433 A1 | 1/2014 | Wentink | |
| 2014/0071873 A1 | 3/2014 | Wang et al. | |
| 2014/0086077 A1 | 3/2014 | Safavi | |
| 2014/0086081 A1 | 3/2014 | Mack et al. | |
| 2014/0098681 A1 | 4/2014 | Stager et al. | |
| 2014/0119288 A1 | 5/2014 | Zhu et al. | |
| 2014/0185501 A1 | 7/2014 | Park et al. | |
| 2014/0185535 A1 | 7/2014 | Park et al. | |
| 2014/0192820 A1 | 7/2014 | Azizi et al. | |
| 2014/0204821 A1 | 7/2014 | Seok et al. | |
| 2014/0241182 A1 | 8/2014 | Smadi | |
| 2014/0242914 A1 | 8/2014 | Monroe | |
| 2014/0307653 A1 | 10/2014 | Liu et al. | |
| 2015/0016438 A1 | 1/2015 | Harel et al. | |
| 2015/0085777 A1 | 3/2015 | Seok | |
| 2015/0124634 A1 | 5/2015 | Harel et al. | |
| 2015/0139212 A1 | 5/2015 | Wang et al. | |

FOREIGN PATENT DOCUMENTS

| | | |
|---|---|---|
| EP | 2 234 355 | 9/2010 |
| EP | 2 498 462 | 9/2012 |
| JP | 2009-182441 | 8/2009 |
| JP | 2009-278444 | 11/2009 |
| WO | WO 03/047033 | 6/2003 |
| WO | WO 03/073645 | 9/2003 |
| WO | WO 2010/085854 | 8/2010 |
| WO | WO 2011/060058 | 5/2011 |
| WO | WO 2013/192112 | 12/2013 |

OTHER PUBLICATIONS

Office Action issued by the United States Patent and Trademark Office for U.S. Appl. No. 13/630,146 dated Mar. 27, 2013.
Office Action issued by the United States Patent and Trademark Office for U.S. Appl. No. 13/762,159 dated Apr. 16, 2013.
Office Action issued by the United States Patent and Trademark Office for U.S. Appl. No. 13/762,191 dated May 2, 2013.
Office Action issued by the United States Patent and Trademark Office for U.S. Appl. No. 13/762,188 dated May 15, 2013.
Office Action issued by the United States Patent and Trademark Office for U.S. Appl. No. 13/776,204 dated May 21, 2013.
Office Action issued by the United States Patent and Trademark Office for U.S. Appl. No. 13/770,255 dated Jun. 6, 2013.
Office Action issued by the United States Patent and Trademark Office for U.S. Appl. No. 13/776,068 dated Jun. 11, 2013.
Notice of Allowance issued by the United States Patent and Trademark Office for U.S. Appl. No. 13/762,159 dated Jun. 20, 2013.
Office Action issued by the United States Patent and Trademark Office for U.S. Appl. No. 13/775,886 dated Jul. 17, 2013.
Notice of Allowance issued by the United States Patent and Trademark Office for U.S. Appl. No. 13/762,191 dated Jul. 19, 2013.
Notice of Allowance issued by the United States Patent and Trademark Office for U.S. Appl. No. 13/630,146 dated Jul. 31, 2013.
Notice of Allowance issued by the United States Patent and Trademark Office for U.S. Appl. No. 13/762,188 dated Aug. 19, 2013.
Notice of Allowance issued by the United States Patent and Trademark Office for U.S. Appl. No. 13/770,255 dated Sep. 17, 2013.
Ahmadi-Shokouh et al., "Pre-LNA Smart Soft Antenna Selection for MIMO Spatial Multiplexing/Diversity System when Amplifier/Sky Noise Dominates", European Transactions on Telecommunications, Wiley & Sons, Chichester, GB, vol. 21, No. 7, Nov. 1, 2010, pp. 663-677.

Office Action issued by the United States Patent and Trademark Office for U.S. Appl. No. 13/889,150 dated Sep. 25, 2013.
Office Action issued by the United States Patent and Trademark Office for U.S. Appl. No. 13/955,320 dated Oct. 15, 2013.
Office Action issued by the United States Patent and Trademark Office for U.S. Appl. No. 13/776,204 dated Oct. 23, 2013.
Office Action issued by the United States Patent and Trademark Office for U.S. Appl. No. 13/955,194 dated Oct. 30, 2013.
Office Action issued by the United States Patent and Trademark Office for U.S. Appl. No. 14/013,190 dated Nov. 5, 2013.
Office Action issued by the United States Patent and Trademark Office for U.S. Appl. No. 13/776,068 dated Nov. 5, 2013.
Office Action issued by the United States Patent and Trademark Office for U.S. Appl. No. 14/010,771 dated Dec. 17, 2013.
Office Action issued by the United States Patent and Trademark Office for U.S. Appl. No. 14/065,182 dated Dec. 17, 2013.
Office Action issued by the United States Patent and Trademark Office for U.S. Appl. No. 14/068,863 dated Dec. 17, 2013.
Office Action issued by the United States Patent and Trademark Office for U.S. Appl. No. 14/011,521 dated Dec. 23, 2013.
Office Action issued by the United States Patent and Trademark Office for U.S. Appl. No. 13/775,886 dated Jan. 7, 2014.
Office Action issued by the United States Patent and Trademark Office for U.S. Appl. No. 14/018,965 dated Jan. 13, 2014.
Office Action issued by the United States Patent and Trademark Office for U.S. Appl. No. 13/858,302 dated Jan. 16, 2014.
Office Action issued by the United States Patent and Trademark Office for U.S. Appl. No. 14/042,020 dated Jan. 16, 2014.
Office Action issued by the United States Patent and Trademark Office for U.S. Appl. No. 14/102,539 dated Jan. 27, 2014.
Office Action issued by the United States Patent and Trademark Office for U.S. Appl. No. 14/087,376 dated Jan. 29, 2014.
Notice of Allowance issued by the United States Patent and Trademark Office for U.S. Appl. No. 13/776,204 dated Jan. 31, 2014.
Office Action issued by the United States Patent and Trademark Office for U.S. Appl. No. 14/094,644 dated Feb. 6, 2014.
Notice of Allowance issued by the United States Patent and Trademark Office for U.S. Appl. No. 13/955,320 dated Feb. 21, 2014.
Huang et al., "Antenna Mismatch and Calibration Problem in Coordinated Multi-point Transmission System," IET Communications, 2012, vol. 6, Issue 3, pp. 289-299.
Office Action issued by the United States Patent and Trademark Office for U.S. Appl. No. 14/109,904 dated Feb. 27, 2014.
Notice of Allowance issued by the United States Patent and Trademark Office for U.S. Appl. No. 14/172,500 dated Mar. 26, 2014.
Notice of Allowance issued by the United States Patent and Trademark Office for U.S. Appl. No. 14/065,182 dated Mar. 25, 2014.
Notice of Allowance issued by the United States Patent and Trademark Office for U.S. Appl. No. 14/068,863 dated Mar. 25, 2014.
Office Action issued by the United States Patent and Trademark Office for U.S. Appl. No. 14/010,771 dated Apr. 4, 2014.
Office Action issued by the United States Patent and Trademark Office for U.S. Appl. No. 14/085,352 dated Apr. 7, 2014.
Office Action issued by the United States Patent and Trademark Office for U.S. Appl. No. 13/889,150 dated Apr. 9, 2014.
Notice of Allowance issued by the United States Patent and Trademark Office for U.S. Appl. No. 13/955,194 dated Apr. 9, 2014.
Office Action issued by the United States Patent and Trademark Office for U.S. Appl. No. 14/097,765 dated Apr. 22, 2014.
Notice of Allowance issued by the United States Patent and Trademark Office for U.S. Appl. No. 14/087,376 dated May 9, 2014.
Office Action issued by the United States Patent and Trademark Office for U.S. Appl. No. 14/143,580 dated May 9, 2014.
Notice of Allowance issued by the United States Patent and Trademark Office for U.S. Appl. No. 13/776,068 dated May 13, 2014.
Office Action issued by the United States Patent and Trademark Office for U.S. Appl. No. 14/013,190 dated May 20, 2014.
Office Action issued by the United States Patent and Trademark Office for U.S. Appl. No. 14/085,252 dated Jun. 18, 2014.
Office Action issued by the United States Patent and Trademark Office for U.S. Appl. No. 14/094,644 dated Jun. 24, 2014.
Notice of Allowance issued by the United States Patent and Trademark Office for U.S. Appl. No. 14/102,539 dated Jun. 24, 2014.

(56) References Cited

OTHER PUBLICATIONS

Office Action issued by the United States Patent and Trademark Office for U.S. Appl. No. 14/011,521 dated Jul. 1, 2014.
Notice of Allowance issued by the United States Patent and Trademark Office for U.S. Appl. No. 14/109,904 dated Jul. 2, 2014.
Notice of Allowance issued by the United States Patent and Trademark Office for U.S. Appl. No. 13/889,150 dated Jul. 8, 2014.
Office Action issued by the United States Patent and Trademark Office for U.S. Appl. No. 14/250,767 dated Jul. 10, 2014.
Notice of Allowance issued by the United States Patent and Trademark Office for U.S. Appl. No. 14/085,352 dated Jul. 23, 2014.
Notice of Allowance issued by the United States Patent and Trademark Office for U.S. Appl. No. 14/013,190 dated Jul. 25, 2014.
Office Action issued by the United States Patent and Trademark Office for U.S. Appl. No. 14/198,280 dated Jul. 29, 2014.
Office Action issued by the United States Patent and Trademark Office for U.S. Appl. No. 14/042,020 dated Jul. 31, 2014.
Notice of Allowance issued by the United States Patent and Trademark Office for U.S. Appl. No. 14/010,771 dated Aug. 6, 2014.
Office Action issued by the United States Patent and Trademark Office for U.S. Appl. No. 14/306,458 dated Aug. 13, 2014.
Office Action issued by the United States Patent and Trademark Office for U.S. Appl. No. 14/297,898 dated Aug. 15, 2014.
Notice of Allowance issued by the United States Patent and Trademark Office for U.S. Appl. No. 14/085,252 dated Aug. 27, 2014.
Office Action issued by the United States Patent and Trademark Office for U.S. Appl. No. 14/181,844 dated Aug. 29, 2014.
Office Action issued by the United States Patent and Trademark Office for U.S. Appl. No. 14/296,209 dated Sep. 4, 2014.
Notice of Allowance issued by the United States Patent and Trademark Office for U.S. Appl. No. 14/097,765 dated Sep. 8, 2014.
Notice of Allowance issued by the United States Patent and Trademark Office for U.S. Appl. No. 14/143,580 dated Sep. 8, 2014.
Office Action issued by the United States Patent and Trademark Office for U.S. Appl. No. 14/198,155 dated Sep. 12, 2014.
Office Action issued by the United States Patent and Trademark Office for U.S. Appl. No. 14/173,640 dated Oct. 6, 2014.
Office Action issued by the United States Patent and Trademark Office for U.S. Appl. No. 14/449,431 dated Oct. 10, 2014.
Office Action issued by the United States Patent and Trademark Office for U.S. Appl. No. 14/171,736 dated Oct. 16, 2014.
Notice of Allowance issued by the United States Patent and Trademark Office for U.S. Appl. No. 14/011,521 dated Oct. 20, 2014.
Office Action issued by the United States Patent and Trademark Office for U.S. Appl. No. 14/320,920 dated Oct. 23, 2014.
Notice of Allowance issued by the United States Patent and Trademark Office for U.S. Appl. No. 13/889,150 dated Nov. 10, 2014.
Office Action issued by the United States Patent and Trademark Office for U.S. Appl. No. 13/775,886 dated Nov. 17, 2014.
Notice of Allowance issued by the United States Patent and Trademark Office for U.S. Appl. No. 14/198,280 dated Nov. 18, 2014.
Office Action issued by the United States Patent and Trademark Office for U.S. Appl. No. 14/480,920 dated Nov. 18, 2014.
Office Action issued by the United States Patent and Trademark Office for U.S. Appl. No. 14/481,319 dated Nov. 19, 2014.
Office Action issued by the United States Patent and Trademark Office for U.S. Appl. No. 14/273,866 dated Nov. 28, 2014.
Office Action issued by the United States Patent and Trademark Office for U.S. Appl. No. 14/042,020 dated Dec. 1, 2014.
Office Action issued by the United States Patent and Trademark Office for U.S. Appl. No. 13/888,057 dated Dec. 3, 2014.
Notice of Allowance issued by the United States Patent and Trademark Office for U.S. Appl. No. 14/297,898 dated Dec. 5, 2014.
Notice of Allowance issued by the United States Patent and Trademark Office for U.S. Appl. No. 14/281,358 dated Dec. 16, 2014.
Office Action issued by the United States Patent and Trademark Office for U.S. Appl. No. 14/250,767 dated Dec. 26, 2014.
Notice of Allowance issued by the United States Patent and Trademark Office for U.S. Appl. No. 14/097,765 dated Dec. 31, 2014.
Office Action issued by the United States Patent and Trademark Office for U.S. Appl. No. 14/181,844 dated Jan. 5, 2015.
Office Action issued by the United States Patent and Trademark Office for U.S. Appl. No. 14/306,458 dated Jan. 9, 2015.
International Search Report and Written Opinion for International Application No. PCT/US14/65958 dated Jan. 13, 2015.
Notice of Allowance issued by the United States Patent and Trademark Office for U.S. Appl. No. 14/198,155 dated Jan. 26, 2015.
Notice of Allowance issued by the United States Patent and Trademark Office for U.S. Appl. No. 14/296,209 dated Jan. 27, 2015.
International Search Report and Written Opinion for PCT International Application No. PCT/US2014/064346 dated Jan. 29, 2015.
Mitsubishi Electric, "Discussion on Antenna Calibration in TDD", 3GPP Draft; R1-090043, $3^{rd}$Generation Partnership Project (3GPP), Mobile Competence Centre; 650, Route Des Lucioles; F-06921 Sophia-Antipolis Cedex; France, No. Ljubljana; 20090107, Jan. 7, 2009, pp. 1-4.
Alcatel-Lucent Shanghai Bell et al., "Antenna Array Calibration for TDD CoMP", 3GPP Draft; R1100427, $3^{rd}$Generation Partnership Project (3GPP), Mobile Competence Centre; 650, Route Des Lucioles; F06921 Sophia-Antipolis Cedex; France, Vol. RAN WG1, No. Valencia, Spain; 20100118, Jan. 12, 2010, pp. 1-5.
Office Action issued by the United States Patent and Trademark Office for U.S. Appl. No. 14/173,640 dated Feb. 3, 2015.
International Search Report and Written Opinion for PCT International Application No. PCT/US2014/064185 dated Feb. 5, 2015.
Kai Yang et al., "Coordinated Dual-Layer Beamforming for Public Safety Network: Architecture and Algorithms", Communications (ICC), 2012 IEEE International Conference on, IEEE, Jun. 10, 2012, pp. 4095-4099.
Songtao et al., "A Distributed Adaptive GSC Beamformer over Coordinated Antenna Arrays Network for Interference Mitigation", Asilomar Conference on Signals, Systems and Computers, Conference Record, IEEE Computer Society, US, Nov. 4, 2012, pp. 237-242.
International Search Report and Written Opinion for PCT International Application No. PCT/US2014/065635 dated Feb. 13, 2015.
Notice of Allowance issued by the United States Patent and Trademark Office for U.S. Appl. No. 14/171,736 mailed Feb. 20, 2015.
Office Action issued by the United States Patent and Trademark Office for U.S. Appl. No. 14/320,920 dated Feb. 23, 2015.
Office Action issued by the United States Patent and Trademark Office for U.S. Appl. No. 14/543,357 dated Apr. 23, 2015.
Office Action issued by the United States Patent and Trademark Office for U.S. Appl. No. 14/450,625 dated Apr. 28, 2015.
Office Action issued by the United States Patent and Trademark Office for U.S. Appl. No. 14/250,767 dated Apr. 29, 2015.
Office Action issued by the United States Patent and Trademark Office for U.S. Appl. No. 14/181,844 dated May 13, 2015.
Notice of Allowance issued by the United States Patent and Trademark Office for U.S. Appl. No. 13/775,886 dated May 26, 2015.
Office Action issued by the United States Patent and Trademark Office for U.S. Appl. No. 14/320,920 dated May 29, 2015.
Office Action issued by the United States Patent and Trademark Office for U.S. Appl. No. 14/481,319 dated Jun. 12, 2015.
Notice of Allowance issued by the United States Patent and Trademark Office for U.S. Appl. No. 14/505,655 dated Jun. 17, 2015.
Office Action issued by the United States Patent and Trademark Office for U.S. Appl. No. 14/472,759 dated Jun. 18, 2015.
Office Action issued by the United States Patent and Trademark Office for U.S. Appl. No. 14/042,020 dated Jun. 19, 2015.
Notice of Allowance issued by the United States Patent and Trademark Office for U.S. Appl. No. 14/480,920 dated Jun. 22, 2015.
International Search Report and Written Opinion for PCT International Application No. PCT/US2014/062116 dated Jun. 22, 2015.
Office Action issued by the United States Patent and Trademark Office for U.S. Appl. No. 14/467,415 dated Jun. 30, 2015.

* cited by examiner

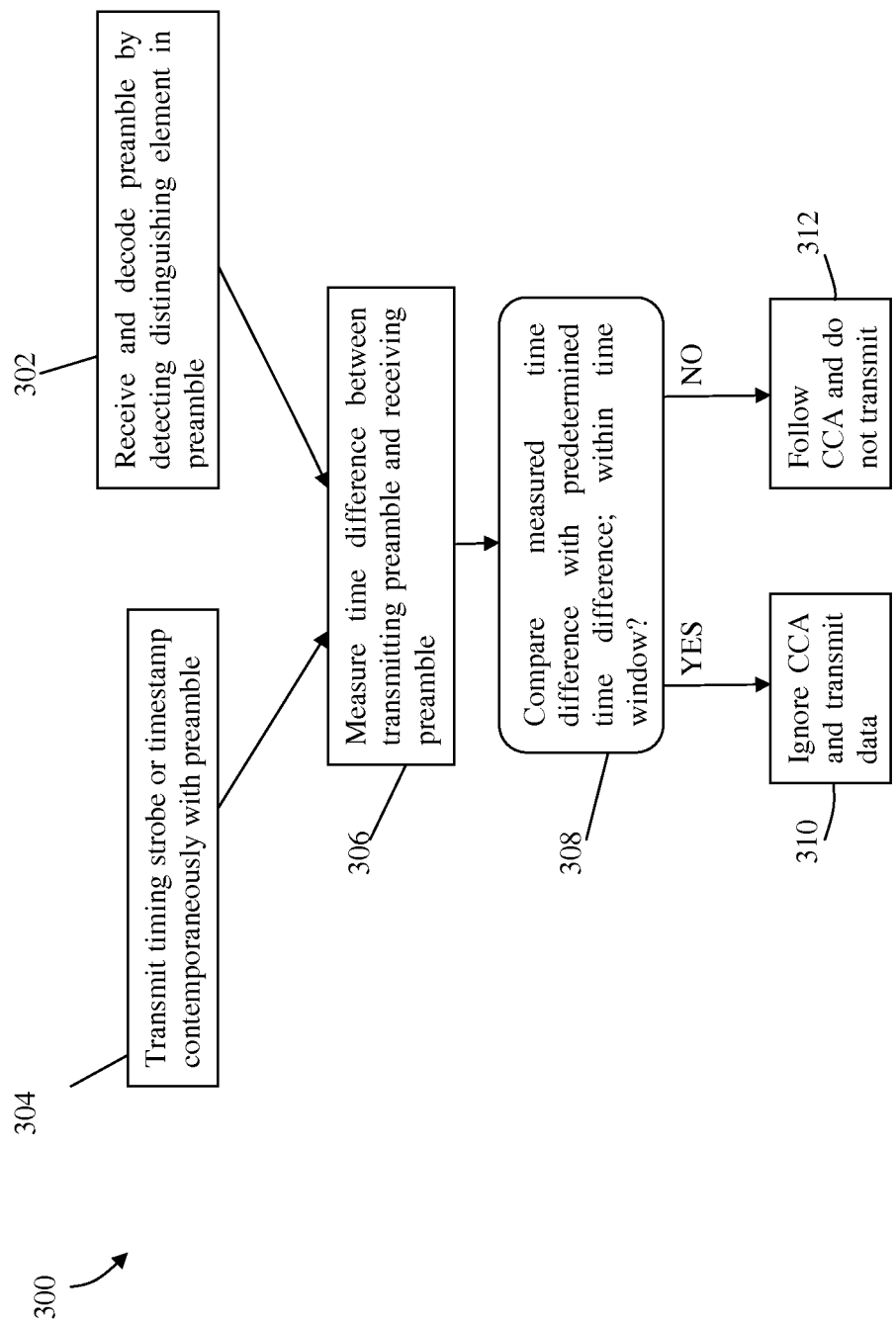

FIG. 5

| | UE on Beam 1 | AP on Beam 1 | Other AP co-located with AP on Beam 1 | Preamble detection by AP on Beam 1 | Action by AP on Beam 1 | Consequences of actions by AP 1 |
|---|---|---|---|---|---|---|
| 501 | No activity | Wants to transmit | None transmitting | No detection | Proceeds to transmit | UE receives data. |
| 502 | No activity | Wants to transmit | One or many are transmitting | CCA detects preamble and confirms co-located AP | Proceeds to transmit | UE receives data. |
| 503 | UE is active and sends strong preamble | Wants to transmit | None, one or many transmitting | CCA detects and confirms it is NOT from co-located AP | Waits | UE sends data |
| 504 | UE is active and sends weak preamble | Wants to transmit | None, one or many transmitting | CCA does not detect because preamble it is weak | Proceeds to transmit | UE is jammed because AP on beam 1 sends data |
| 505 | UE is active and marginal preamble | Wants to transmit | One or many are transmitting | CCA does not detect because all preambles are jammed | Proceeds to transmit | UE is jammed because AP beam 1 sends data |
| 506 | UE is active and sends strong preamble that is masked in the timing window | Wants to transmit | One or many transmitting | CCA detects and DE confirms from co-located AP | Proceeds to transmit | UE is jammed because AP on beam 1 sends data |

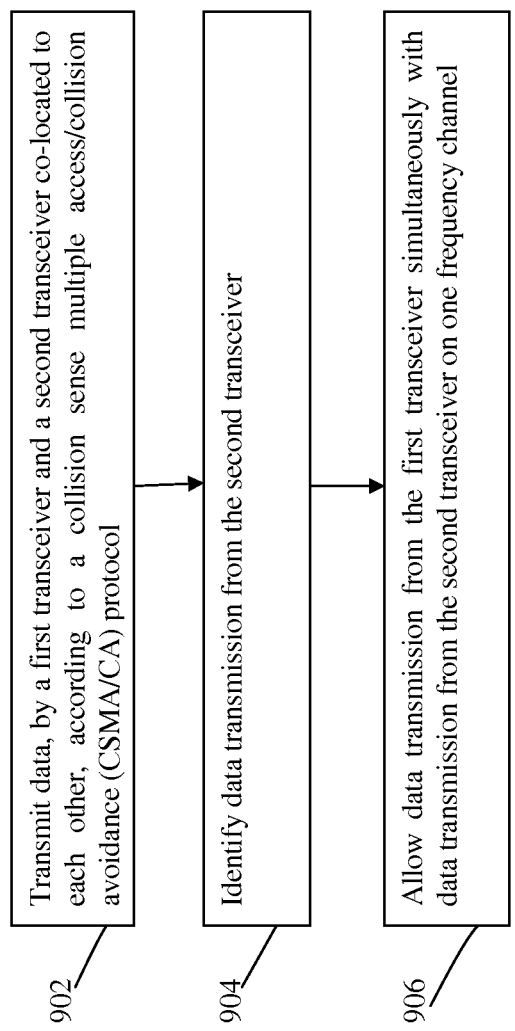

SYSTEM AND METHOD FOR CO-LOCATED AND CO-CHANNEL WI-FI ACCESS POINTS

CROSS REFERENCE TO RELATED APPLICATIONS

This application claims benefit of U.S. Provisional Patent application No. 61/805,770 filed on Mar. 27, 2013 which is incorporated herein by reference in its entirety.

FIELD OF THE PRESENT INVENTION

The present invention relates generally to the field of radio frequency (RF) multiple-input-multiple-output (MIMO) systems and in particular to systems and methods for enhanced performance of RF MIMO systems using RF beamforming and/or digital signal processing.

BACKGROUND

Active antenna systems may implement 1-dimensional and 2-dimensional multibeam base stations that focus transmission and reception into narrow sub-sectors, facilitate reduced interference to neighboring cells, and enable reuse of the radio spectrum at its own cell by activating independent simultaneous co-channel non-overlapping beams.

Base stations may separate transmission and reception by using different frequencies or different time divisions for transmission and reception. For example, cellular protocols, such as GSM (Global System for Mobile Communications), WiMAX (Worldwide Interoperability for Microwave Access), and LTE (Long-Term Evolution), may sync (synchronize) all transmission and receiving channels using time-division. WiFi base stations, which may incorporate a multi-beamforming cluster of co-located, co-channel Wi-Fi access points, may not inherently include such syncing capabilities and may operate inefficiently when in close proximity, due to the nature of the CSMA/CA (Carrier sense multiple access with collision avoidance) property of the Wi-Fi protocol, which requires yielding to all first-come Wi-Fi data transmission in order to avoid transmission collisions or jamming. While co-located, co-channel Wi-Fi access points may provide super-isolation of data transmission via RF manipulation methods, performance may be improved by distinguishing between identified channel capturing signals originated locally (e.g., from another AP in the same cluster) and originated remotely (e.g., signals coming from UEs or non-cluster APs).

SUMMARY

A wireless communication system may include a first transceiver co-located with a second transceiver. The first and second transceivers may be configured to transmit data to at least one user equipment, according to a collision sense multiple access/collision avoidance (CSMA/CA) protocol. A processor may identify data transmission from the second transceiver and allow data transmission from the first transceiver simultaneously with data transmission from the second transceiver, on one frequency.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 is a flowchart of a method for detecting a preamble from a co-located transceiver, according to embodiments of the invention.

FIG. 5 is a chart of different example CCA scenarios encountered by transceivers that desire to transmit, according to embodiments of the invention.

FIG. 9 is a flowchart for a method according to an embodiment of the invention.

Figure 1:
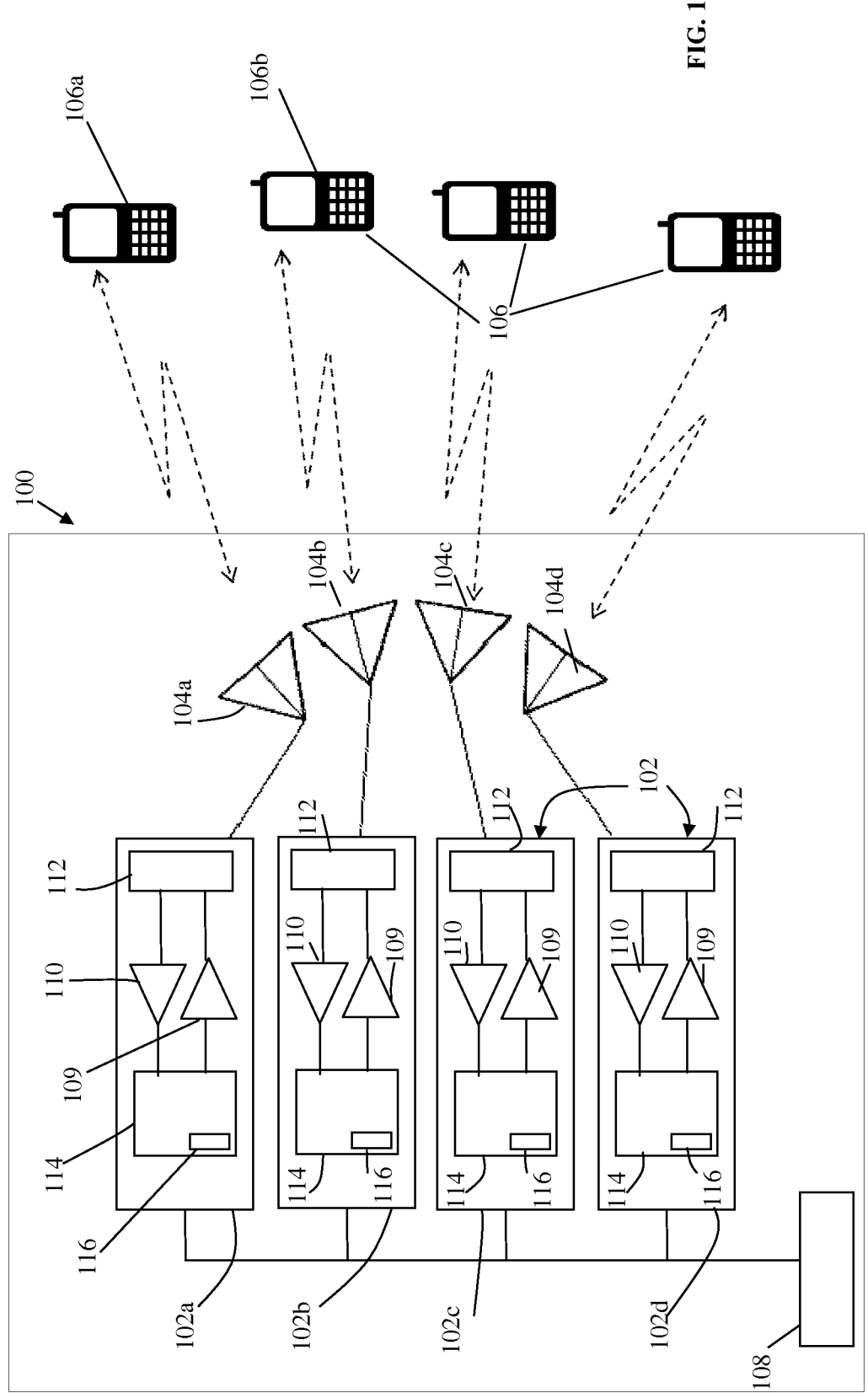
FIG. 1 is an illustration of a Multibeam Access Point or base station with four beamforming transceivers or access points transmitting on one or the same frequency channel.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the invention may be described in reference to the IEEE (Institute of Electrical and Electronics Engineer) 802.11 standard for implementing wireless local area networks (WLAN). "802.11xx" may refer to any version of the 802.11 standard, such as 802.11a, 802.11g, or 802.11ac, for example Versions of the 802.11 standard may operate using a technique called Collision Sense Multiple Access/Collision Avoidance (CSMA/CA), a networking method which aims to prevent transmission collisions before they occur. While embodiments of the invention are described in terms of the 802.11 protocol, other network protocols built on the CSMA/CA concept may be used.

Access points (AP's) using a CSMA/CA wireless network, including IEEE 802.11 WiFi networks, may determine whether a radio channel is clear, prior to broadcasting or transmitting data in the channel. The AP may do this by performing a clear channel assessment (CCA), which includes two functions: listening to received energy on an RF interface (termed "energy detection"), or detecting and decoding an incoming Wi-Fi signal preamble from a nearby AP. A signal preamble may be a signal used to synchronize transmission timing between two devices and may occur at the beginning of every data packet. In a communication standard such as Wi-Fi, a preamble may have a predefined structure and data fields organized in a way that all devices communicating on the standard understand. A CCA is deemed 'busy' and thus not available if an AP's receiver can sense radio energy, from another AP, above a CCA sensitivity level or if an AP detects an incoming WiFi signal preamble. The AP may also maintain a Network Allocation Vector (NAV), which acts as a countdown timer to when the AP may begin to transmit data. Based on signals from nearby AP's which may indicate the length of a transmitted data packet, an AP's NAV may update the time to transmission, causing further delay to an AP's data transmission. An AP may defer from using the channel to transmit data until both conditions (e.g., CCA deemed 'busy' and the NAV timer) have expired.

Embodiments of the invention may describe an enhancement to the operation of CSMA/CA (Collision Sense Multiple Access/Collision Avoidance) radio networks by, for example, increasing the carrying capacity CSMA/CA networks which incorporate directional antennas. For example, a Multibeam Access Point, which may act as a Wi-Fi base station, may include a cluster of co-located Wi-Fi access points or transceivers, each access point with independent transmit and receive capabilities. As used herein, transceiver and AP may be used interchangeably as any device having independent transmit and receive functions and capable of acting as a 802.11xx access point. Each access point or transceiver may use directive antennas to focus the radio energy on an azimuth covering an intended user on a user equipment (UE), enabling one or the same radio frequency or frequency channel (e.g., the same or overlapping frequency spectrum) to be used simultaneously or concurrently on a different azimuth beam which points to a different UE. Transceivers or access points may be co-located if, under ordinary usage of the CSMA/CA technique, data transmission from one transceiver prevents simultaneous data transmission from another transceiver on the same channel or frequency. The transceivers' co-location or proximity to each other may cause, for example, RF interference, a busy CCA, or an updated NAV. Co-located transceivers may be clustered or grouped together into one base station that serves UE's in a limited geographical area. Co-located transceivers may share processing tasks or may each have separate processing capabilities.

FIG. 1 is an illustration of a Multibeam Access Point or base station 100 with four beamforming transceivers 102a-d or access points transmitting on the same channel or frequency channel. Other base stations may include more or fewer access points, but no less than two. Each transceiver or access point 102a-d may be coupled to an antenna 104a-d, and each antenna 104a-d may form directive beams 105 to transmit data to a UE 106. A UE 106 may be a cell phone, smart phone, tablet or any device with Wi-Fi capability and able to communicate with a Wi-Fi access point, or another wireless capable device. UE's 106 may be recognized in a WLAN as a Station (STA) device, according to the IEEE 802.11xx protocol. Each transceiver 102a-d may operate according to the IEEE 802.11xx protocol, or other protocol using CSMA/CA. Transceivers 102a-d may use or share the same communications resources by being able to communicate on the same frequency or frequency channel, such as channel 6 or channel 1 on the 2.4 Ghz band, for example Other channels or frequencies may be used. A controller 108 may interface with or control each transceiver 102a-d. The transceivers 102a-d may each include for example a transmitter 109, receiver 110, antenna interface or RF circuitry 112, and a processor 114 and memory 116, although other or different equipment may be used. Processor 114 may be a general purpose processor configured to perform embodiments of the invention by executing code or software stored in memory 116, or may be other processors, e.g. a dedicated processor.

Due to the properties of the IEEE 802.11 protocol, transceivers 102 co-located on one base station 100 and communicating with UE's 106 on the same frequency channel may be prevented or suppressed from transmitting data simultaneously due to a CCA or NAV update, as explained above. For example, a first transceiver 102a may desire to transmit data on a channel to a UE 106a, and it may first determine if the channel is being used by another transceiver 102b nearby. Through a CCA, the first transceiver 102a may detect that the second transceiver 102b is currently transmitting to a second UE 106b. Although data transmission between the second transceiver 102b and the second UE 106b should not affect data transmission between the first transceiver 102a and 106a, the 802.11 protocol may require the first transceiver 102a to delay transmission until the second transceiver 102b is finished transmitting. With other transceivers 102c and 102d at the base station 100, the first transceiver 102a which desires to transmit may, according to the 802.11 standard, be required to delay transmission until all other transceivers 102c and 102d have finished transmitting on the same frequency. Further, first transceiver 102a may update its NAV and withhold transmission for a period described in the NAV. These delays may contribute to a decrease in the transmission capacity of the base station 100. One remedy is to create RF and antenna isolation between each transceiver 102a-d in the base station which may prevent the receiver 110 of each co-located AP 102 from detecting a preamble or radio energy from other co-located co-channel AP's. However, uncontrollable environmental conditions may affect RF isolation between transceivers 102a-d, and interference may be exacerbated when multiple transceivers desire to transmit. Another method, described herein, may be to adjust the response to the 802.11 protocol between co-located Wi-Fi transceivers, yet follow the protocol in response to incoming signals from Wi-Fi transceivers from other base stations or from UE's.

Figure 2:
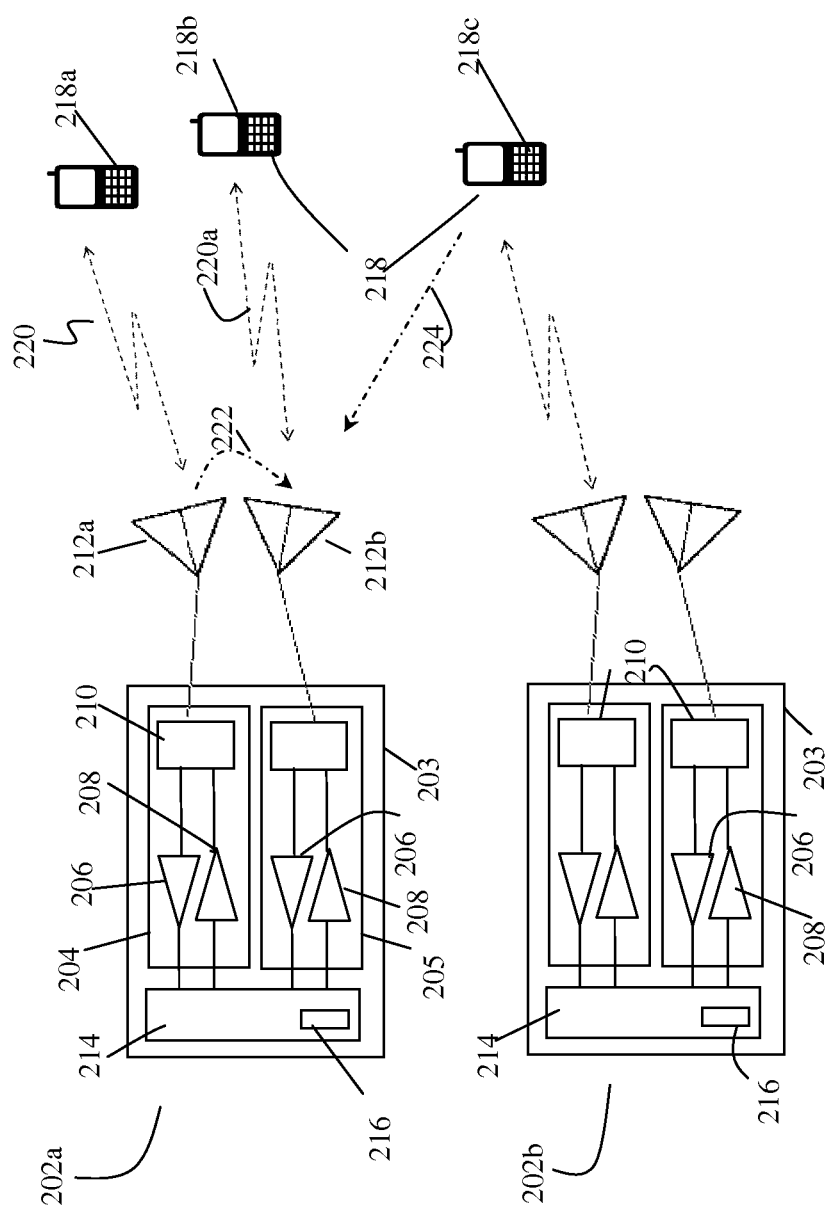
FIG. 2 is a diagram of two transceiver base stations, according to an embodiment of the invention.

FIG. 2 is a diagram of two transceiver base stations, according to an embodiment of the invention. A first base station 202a may include a first transceiver or AP 205 and a second transceiver or AP 204, each co-located to each other in one base station, may be housed in the same device housing 203. The first transceiver 205 and second transceiver 204 may share a processor 214 and memory 216 to implement software. Alternatively, the first transceiver 205 and second transceiver 204 may each have separate processors and memory, as shown in FIG. 1. Each transceiver may include a transmitter 208, receiver 206, RF interface 210 and antenna 212. Each transceiver may be configured to transmit data to at least one UE 218 on a directed beam 220. Data may be transmitted according to a CSMA/CA protocol, such as the IEEE 802.112xx protocol. First transceiver 205 and second transceiver 204 may use or share the same communications resources by being able to communicate on the same frequency or frequency channel.

According to embodiments of the invention, first transceiver 205 may desire to transmit data on a beam 220a with an azimuth directed toward a UE 218, for example Based on the IEEE 802.11xx standard, first transceiver 205 may, prior to transmitting, determine whether a frequency channel is occupied by another transceiver or access point, or a UE transmitting to first transceiver 205. If processor 214 identifies data transmission 222 on the same or one channel or frequency as transmissions by second transceiver 204 which is co-located with first transceiver 205, processor 214 may allow (e.g., by controlling or sending signals to the transceiver or other equipment) first transceiver 205 to transmit data simultaneously with data transmission by second transceiver 204. By allowing simultaneous data transmission from or by first transceiver 205 and second transceiver 204, processor 214 may be ignoring the CSMA/CA rules of the IEEE 802.11 protocol for the case of co-located AP transmission. Processor 214 may identify that second transceiver 204 is transmitting, because during data transmission between second transceiver 204 and UE 218a, first transceiver 205 may receive and decode part of that data transmission, such as a signal preamble, for example. First transceiver 205 may receive an additional indication that the data transmission is from second transceiver, and processor 214 may ignore the CSMA/CA rules, allowing (e.g., by controlling or sending signals to components) simultaneous or concurrent data transmission from first transceiver 205 and second transceiver 204. Processor 214 may be configured to ignore the CSMA/CA rules for co-located transceivers, because each transceiver 204, 205 may be serving individual UE's 218a, 218b on different directional beams, with less likelihood of interference or overloaded bandwidth capacity. Processor 214 may allow or control a transmitter 208 of first transceiver 205 to transmit data to a UE 218 simultaneously with data transmission by the co-located access point, e.g., second transceiver 204.

For other data transmission that is received and decoded by first transceiver 205, processor 214 may follow the CSMA/CA rules of the IEEE 802.11xx standard. For example, UE 218b, which is being served by a beam transmitted by first transceiver 205, may desire to transmit back to first transceiver 205. First transceiver 205 may follow CSMA/CA rules when receiving data from UE 218b, because data transmission from UE 218b would not be identified as coming from second transceiver 204. Therefore, first transceiver 205 may delay transmission until the CCA is deemed clear, e.g., UE has stopped transmitting. In another example, a UE 218c being served by another base station 202b may be near first base station 202a and may transmit data 224 in order to be acknowledged or recognized by first base station 202a. First transceiver may follow CSMA/CA rules when receiving data from UE 218c, because it is not identified as second transceiver 204.

First transceiver 205 and second transceiver 204 of FIG. 2 and transceivers 102a, 102b, 102c, and 102d of FIG. 1 may each include one or more controller(s) or processor(s) 114 and 214, respectively, for executing operations and one or more memory unit(s) 116 and 216, respectively, for storing data and/or instructions (e.g., software) executable by a processor. Processor(s) 114 and 214 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 116 and 216 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units. Processors may be general purpose processors configured to perform embodiments of the invention by for example executing code or software stored in memory, or may be other processors, e.g. dedicated processors.

According to some embodiments, a processor, device or process may identify data transmission from co-located transceivers by detecting a signal preamble from a co-located transceiver. A signal preamble may be periodically sent according to the IEEE 802.11 standard to sync transmission between AP's and stations on a WLAN. Signal preambles from a co-located transceiver may be identified, for example, by determining or measuring a time difference between when a co-located transceiver transmits the signal preamble and when a transceiver receives the signal preamble. The timing difference may be implemented by having a transceiver, simultaneously or contemporaneously with transmitting a signal preamble, transmit a timing strobe or timestamp to other co-located transceivers. Since co-located transceivers may be wire-connected to each other or in the same device housing (as shown in FIG. 2), the transmitted timing strobe may arrive at co-located transceivers in a short amount of time, possibly before or very soon after a preamble is decoded by the co-located transceivers. A processor or receiver of a transceiver may receive the timing strobe and a decoded preamble and determine, based on the time difference between the arrival of the timing strobe and the time of decoding the preamble, whether the preamble is from a co-located transceiver. If the preamble is from a co-located transceiver, e.g., from its own base station, the receiver or processor may ignore CSMA/CA rules and allow simultaneous transmission between the co-located transceivers.

FIG. 3 is a flowchart of a method 300 for detecting a preamble from a co-located transceiver, according to embodiments of the invention. In operation 302, a first transceiver which desires to transmit may perform a CCA. The first transceiver may detect a signal preamble by detecting a distinguishing or distinguishable element in a preamble from a second co-located transceiver. A distinguishable element may be, for example, a characteristic data field in the preamble. Other data fields may be used. For different versions of IEEE 802.11, the distinguishing element may vary depending on the timing and the information in the preamble. In one example, the distinguishing element of a preamble may be a start frame delimiter, which is illustrated herein. Other distinguishing elements may be used. At this point, since the signal preamble may not include address information from the sender of the preamble, the first transceiver may not have an indication that the preamble is from a co-located transceiver.

In operation 304, the second transceiver may transmit a timing strobe or timestamp to the first transceiver. The timing strobe may be simultaneous or contemporaneous with the signal preamble, e.g., the second transceiver may transmit, at the same time or simultaneously with transmitting a signal preamble, a timing signal or strobe to the first transceiver. Alternatively, the second transceiver may transmit the timing strobe simultaneously or contemporaneously with the distinguishing element of the preamble. Other configurations may be used.

In operation 306, a time difference between when the preamble was sent by the second transceiver and when the preamble was received and decoded may be measured or determined, for example by a processor. In one embodiment, the first transceiver may measure the time difference between receiving the timing strobe and detecting a distinguishing element in the preamble. Within the processor of the first transceiver, for example, a second timing strobe may be generated internally when it detects the distinguishing element of the preamble. The two strobes may be input to a comparator with the processor and a time difference measured between the two strobes. Other methods may be used to measure the time difference.

In operation 308, the first transceiver may compare the measured time difference with a predetermined time difference, or a predetermined time window tolerance. The time window tolerance may take into account internal processing delays, such as the time for receiving and decoding the preamble, and then detecting the distinguishing element. Generally, since sending the timing strobe between co-located transceivers may take as short a period of time as a few nanoseconds, a tolerance of e.g. 0.5 μsec may be a reasonable time frame to determine that a signal preamble is being transmitted from a co-located transceiver. The time tolerance may be programmed to be before or after receiving the distinguishing element of the preamble. Other time tolerance windows, such as 0.4 μsec, 0.6 μsec, 1 μsec, or 2 μsec, may be used.

If the measured time difference is within the predetermined time difference, in operation 310, then the signal preamble is deemed to be transmitted from a co-located transceiver. The processor may ignore the CCA and allow simultaneous data transmission from the first transceiver and second transceiver. If the measured time difference is greater than a predetermined time window, or a timing strobe is not received within a predetermined time tolerance of a received distinguishing element of the preamble, then the received preamble is not from a co-located transceiver, and in operation 312, the processor may follow the CCA. By following the CCA, the processor may prevent the first transceiver from transmitting until the frequency channel is clear.

Figure 4A:
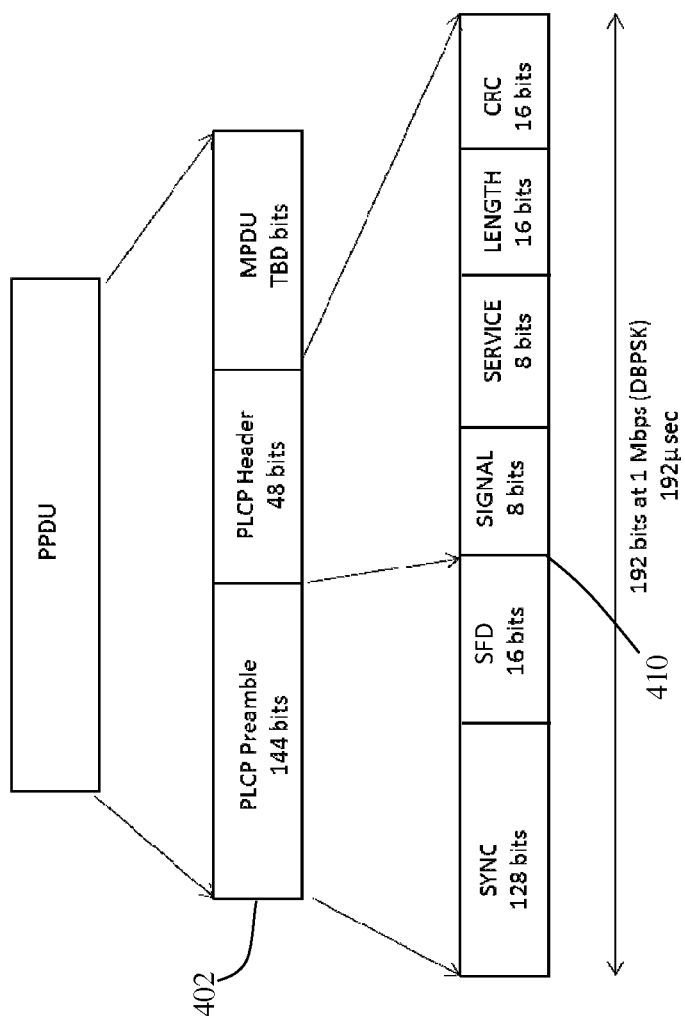
FIGS. 4A-4C illustrate example types of distinguishing elements that may be used to detect a preamble, according to embodiments of the invention.
Figure 4B:
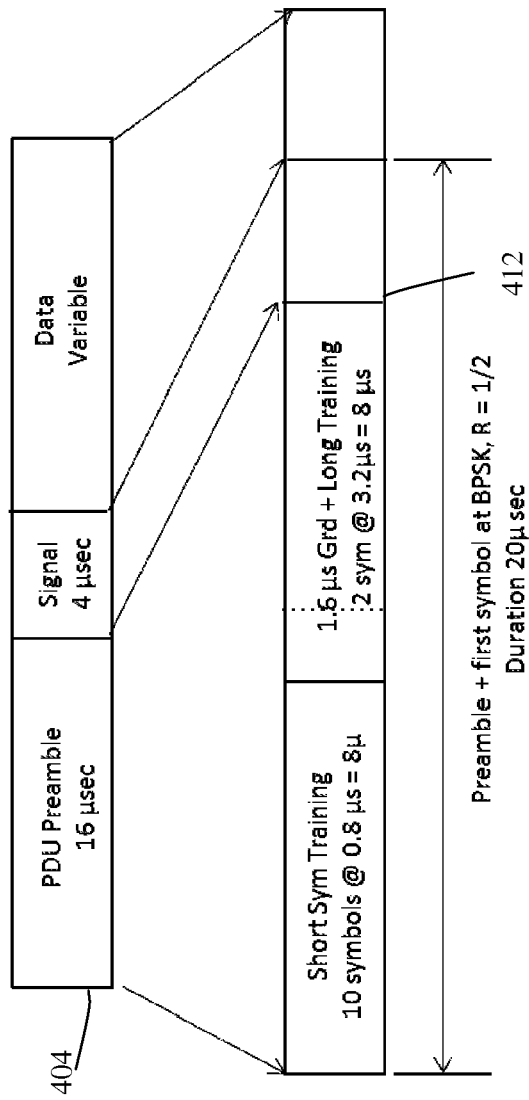
Figure 4C:
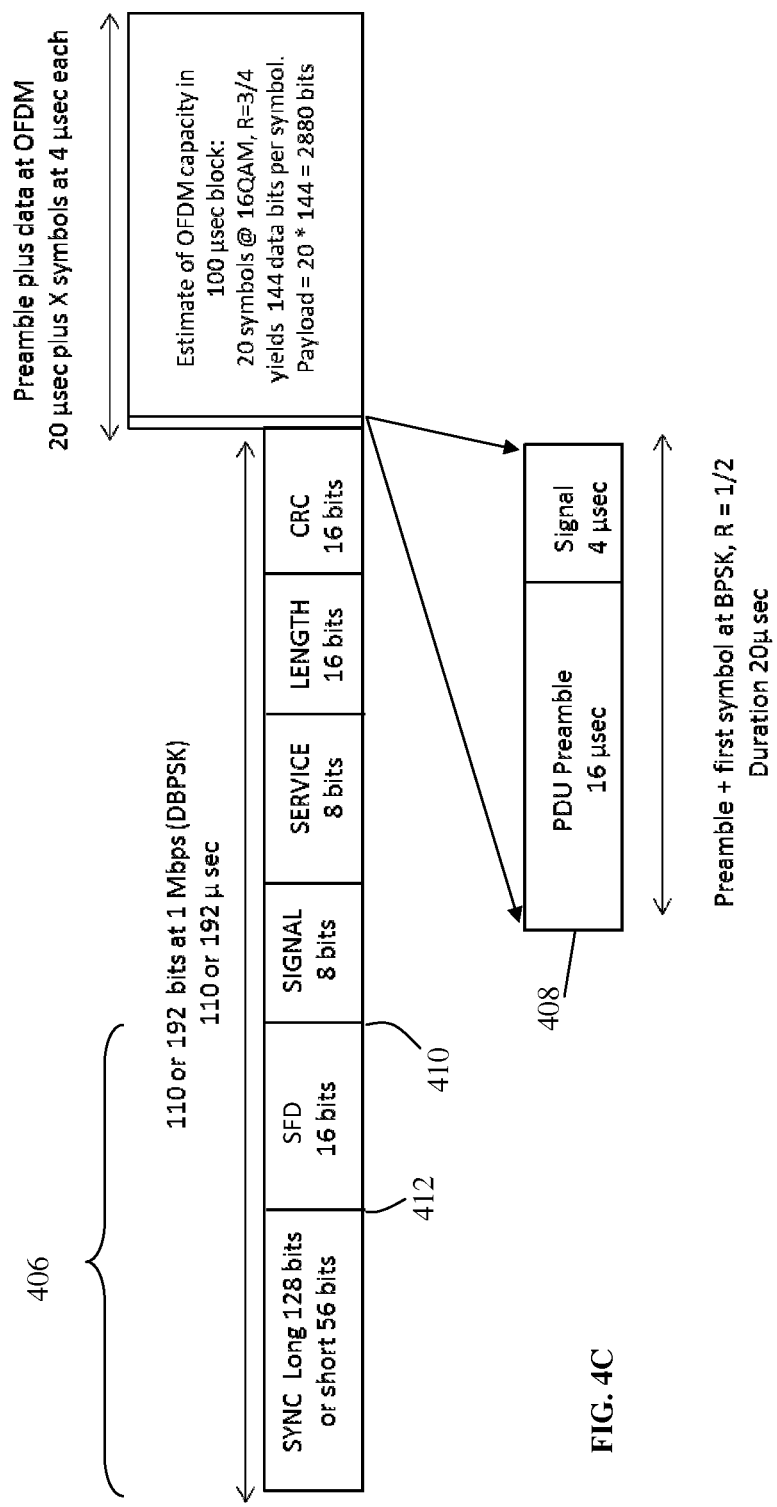

FIGS. 4A-4C illustrate example types of distinguishing elements that may be used to detect a preamble, according to embodiments of the invention. There may be fundamentally three versions of an IEEE 802.11 preamble that may be transmitted: 1) 802.11b DSSS (direct-sequence spread spectrum) preamble transmitted at 1 Mbps over a 144 μsec interval, 2) 802.11a OFDM (orthogonal frequency-division multiplexing) preamble transmitted at 6 Mbps over a 20 μsec interval, and 3) a 802.11g preamble that can be either a 802.11b DSSS type preamble or a 802.11a type preamble. When operating in the presence of 801.11b UEs, a transceiver operating in 802.11g may send the preamble in the ERP-DSSS (Extended Rate Direct Sequence Spread Spectrum mode) for compatibility with 802.11b stations. When 802.11b stations are not present, the 802.11g transceiver may send the preamble in the OFDM mode which is almost identical to the 802.11a preamble. Common to all three of these preambles may be that the preambles may be sent at a data rate equal to or lower than the standard payload data rate. In FIG. 4A and other figures and examples provided herein, other or different specific intervals, rates, and packet structures may be used.

FIG. 4A is a diagram of the structure of the PLCP Data Unit (Physical Layer Convergence Procedure Data Unit) that is used in the 802.11b and 802.11g ERP-DSSS mode. In both cases (802.11b and 802.11g) a PLCP Preamble 402 may be included in the first 144 bits in this data unit and may be transmitted at 1 Mbps.

FIG. 4B is a diagram of the structure of the PLCP Data Unit that may be used in the 802.11a and 802.11g ERP-OFDM mode. In both cases (802.11a and 802.11g) the PLCP Preamble 404 may be 16 μm long and may be transmitted in ODFM at 6 Mbps using BPSK.

FIG. 4C is a diagram of the PLCP Data Unit that is used by the 802.11g in ERP-DSS mode. This mode may be used when a 802.11g transceiver is communicating with 802.11b devices on the network. The PLCP Data Unit in this mode may have two preambles, one after the other. The first preamble 406 may be sent in 801.11b format (so the 802.11b devices can perform CCA) followed by a second preamble 408 sent in OFDM format which is used by the 802.11g devices.

The end of the Start Frame Delimiter (SFD) field 410 may be a distinguishing element in the preamble for 802.11b and 802.11g transmission in ERP-DSS mode (FIGS. 4A and 4C). The end of the second Long Training Sequence 412 may be a distinguishing element for 802.11a and 802.11g transmission, in the ERP-OFDM mode (FIGS. 4B and 4C). Other distinguishing elements may be used.

FIG. 5 is a chart of the different CCA scenarios encountered by transceivers that desire to transmit, according to embodiments of the invention. The scenarios may depend on whether a UE served by a transceiver (e.g., AP on beam 1) desiring to transmit is transmitting or not transmitting, and whether the UE's signal at the transceiver is strong, marginal (meaning about the same level as the leakage from the other transceivers) or weak. In the absence of any activity from the other co-located transceivers, the transmitting transceiver may respond in a manner that follows the CSMA/CA rules, because the transmitting transceiver may not detect any timing strobes or indications that preambles are being transmitted from co-located transceivers. However, if the AP on beam 1 is able to decode a preamble from the UE, AP on beam 1 will wait, according to CSMA/CA rules. If AP on beam 1 cannot decode the preamble, then the AP on beam 1 may transmit and may jam the UE signal, e.g., the AP may transmit when the UE wants to transmit, causing data transmission collisions. This jamming condition may be anticipated in the 802.11 protocol and may provide for ways to recover. It is not expected to happen often, unless the network is highly loaded. When this condition exists in an 802.11 network, performance may fall off rapidly. In scenarios 501, 502, 503, and 504, methods implemented according to embodiments of the invention would not affect the 802.11 implemented. Although jamming may occur under scenario 504, the UE signal is too weak to be detected and jamming may still occur if the CSMA/CA rules were followed.

In scenario 505 preamble jamming may occur when the UE preamble is very close in amplitude to the leakage from the co-located AP's. The preamble from UE in this scenario may not be decoded and UE may not be able to transmit. For this event to occur the UE preamble may be weak (meaning the UE is in the outer coverage area) and the timing of the UE preamble may significantly overlap with the co-located AP preamble. In scenario 506 preamble misidentification and jamming may occur when the UE preamble is strong, but received very close in time to a preamble from one of co-located AP's. In experimentation, scenarios 505 and 506 may occur rarely, as further discussed herein in FIGS. 7 and 8.

Another way to identify data transmission from a co-located transceiver is by suppressing (e.g., preventing the occurrence of) an update to the Network Allocation Network. In some embodiments, both the NAV and the CCA functions may be altered, however, some embodiments may alter the NAV function only and ignoring the CCA function. If only the NAV suppression function is implemented, the transmission decision may be delayed until the portion of the data frame that contains the transmitter address is detected. This delay will lower the capacity improvement that can be achieved if the CCA function is also considered. For 802.11g EPA-DSSS and 802.11b, this delay is significant; it is less significant for 802.11g EPA-OFDM and 802.11a networks.

Figure 6:
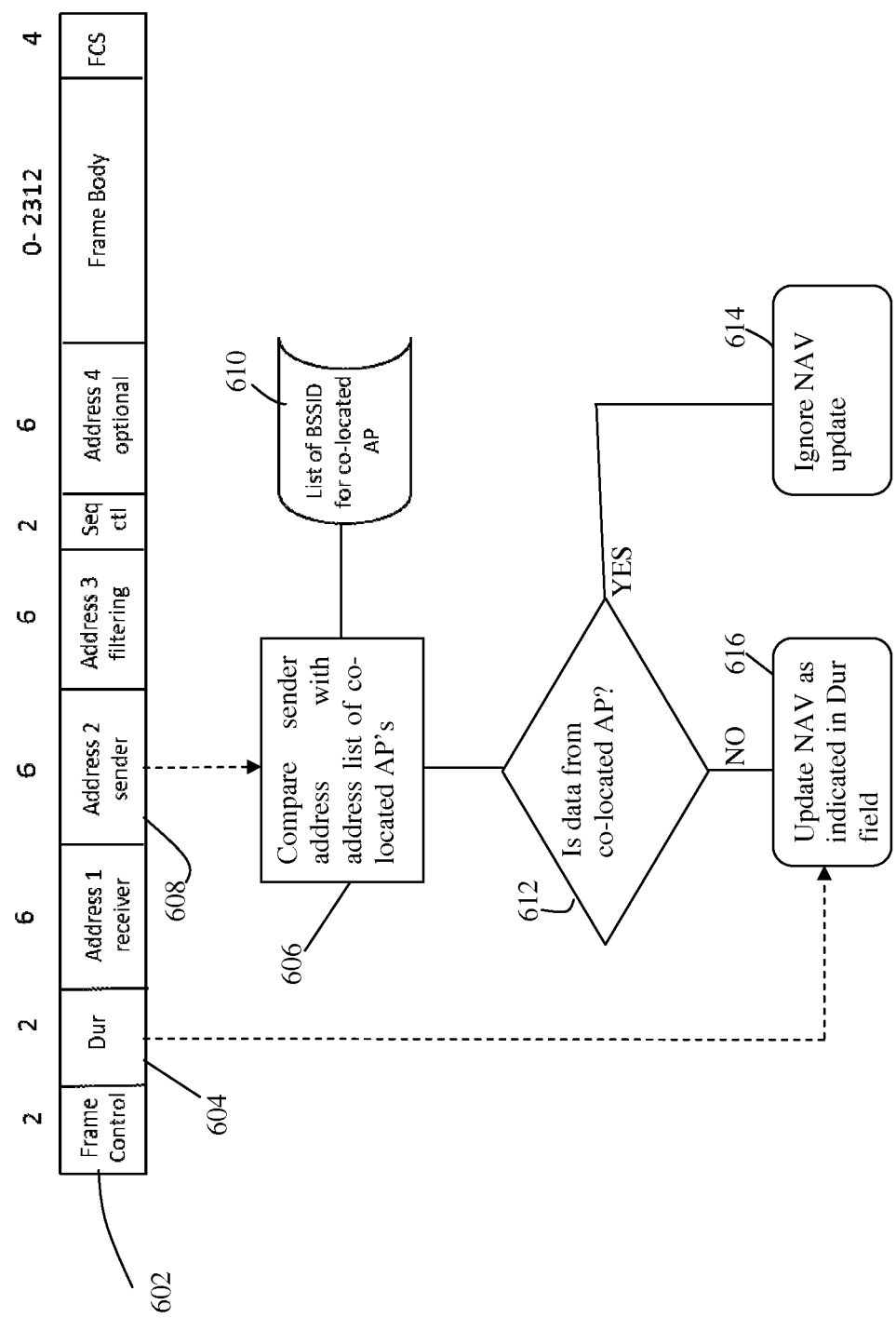
FIG. 6 is a flowchart for suppressing a Network Allocation Vector, according to an embodiment of the invention.

FIG. 6 is a flow chart for suppressing, delaying or preventing the occurrence of a Network Allocation Vector, according to an embodiment of the invention. As mentioned previously an AP or transceiver following CSMA/CA may maintain a Network Allocation Vector (NAV), which acts as a countdown timer to when the transceiver may begin to transmit data. The NAV may update the timer if a transceiver receives a data packet payload indicating that another transceiver or UE will use a frequency for a particular period of time (e.g., for the length of time it takes to send a particular set of data or data packets). The NAV may update for example based on the Dur field 604 in an 802.11 generic data frame 602, which may describe a format for sending a typical data payload. According to some embodiments, a transceiver may only update its NAV if a generic data packet is transmitted from a UE or a transceiver which is not co-located. Thus, if a transceiver receives a generic data packet from a co-located transceiver, the transceiver may suppress, prevent or delay its NAV update. In operation 606, the transceiver may compare a sender address 608, which may be a BSSID (basic service set identification), for example, with a list 610 of BSSID for co-located AP's or transceivers. The list 610 may be stored in memory (e.g., memory 216 of FIG. 2) of the transceiver. The comparison may determine whether the sender address 608 matches with one of the addresses in the list 610 of BSSID's. Based on the comparison, the transceiver may determine, in operation 612, whether the generic data packet 602 is from a co-located AP or transceiver and if so, operation 614 may ignore the NAV update with the Dur field 604. If the transceiver determines that the generic data packet 602 is not from a co-located transceiver (e.g., sender address 608 does not exist in the list 610 of BSSID), in operation 616 the NAV is updated with the value indicated in the Dur field 604. A processor that has decoded the generic data frame may pass or transmit the Dur value to the NAV timer.

Figure 7A:
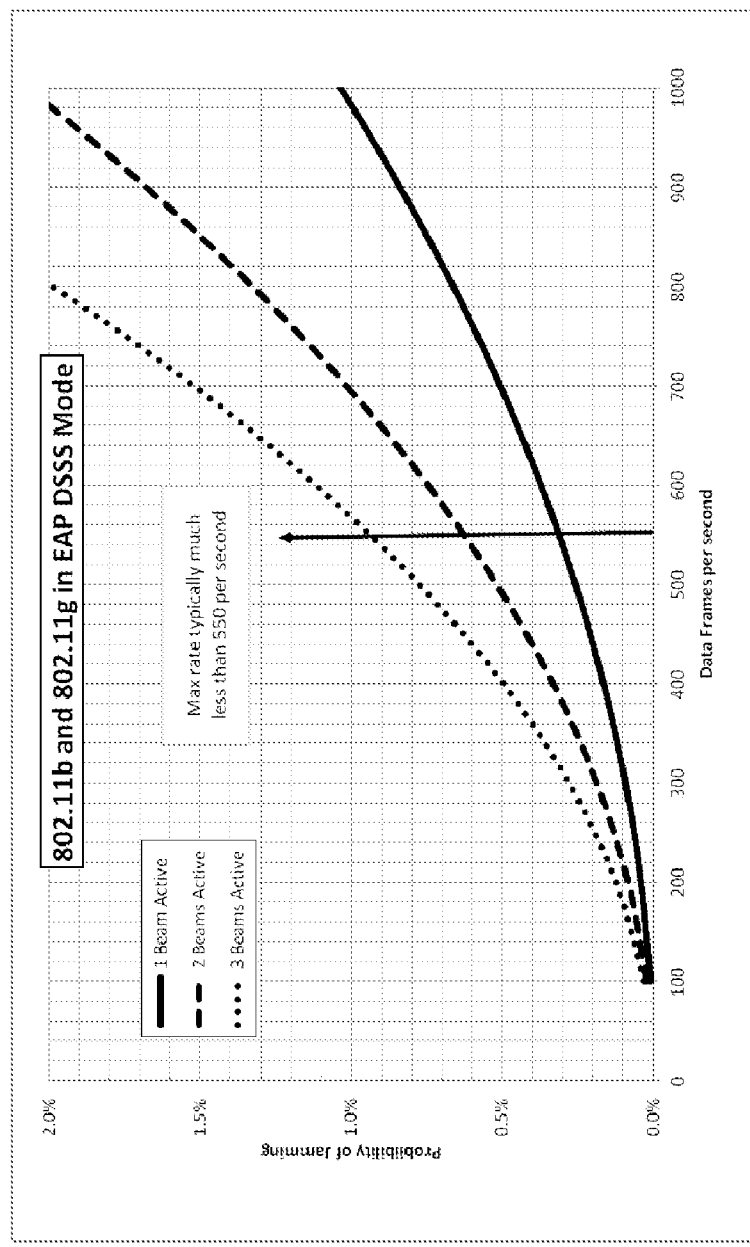
FIGS. 7A, 7B, and 8 include charts illustrating the probability of errors occurring according to an embodiment of the invention.
Figure 7B:
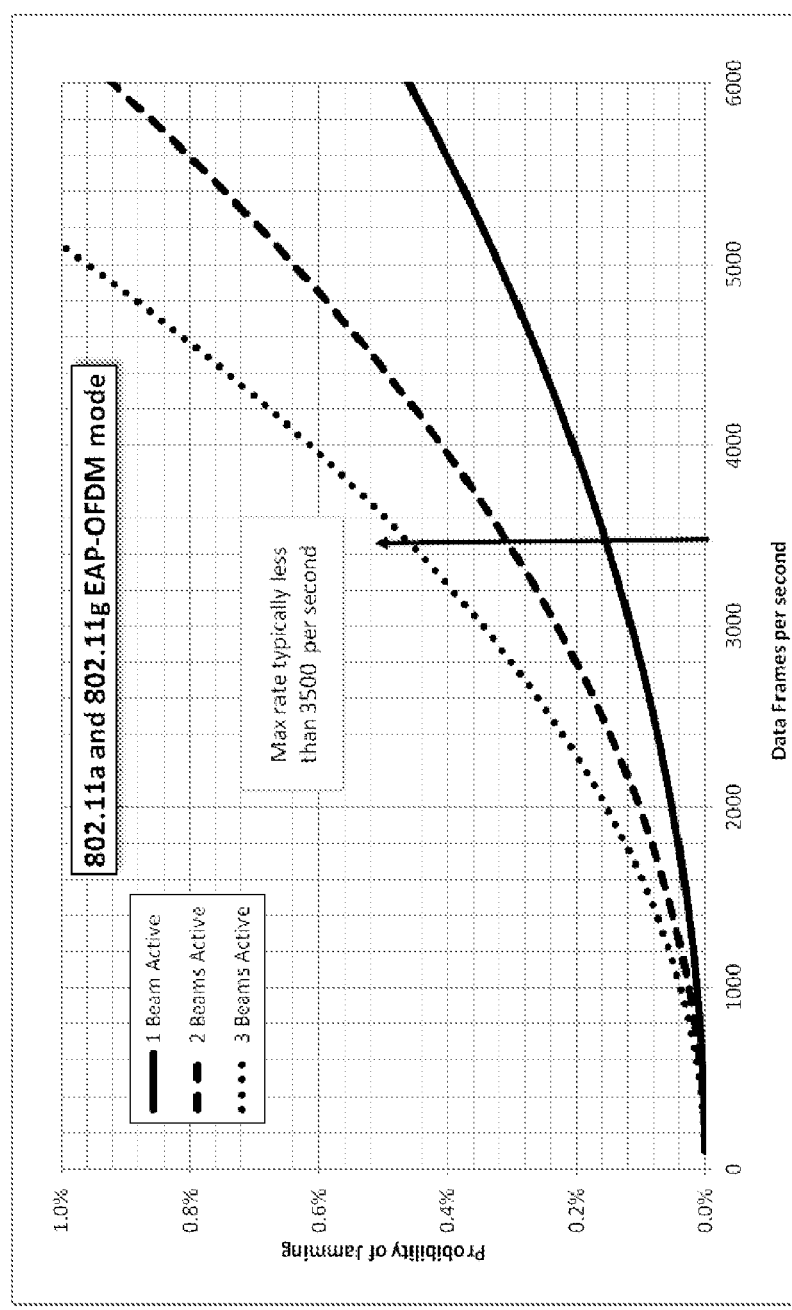
Figure 8:
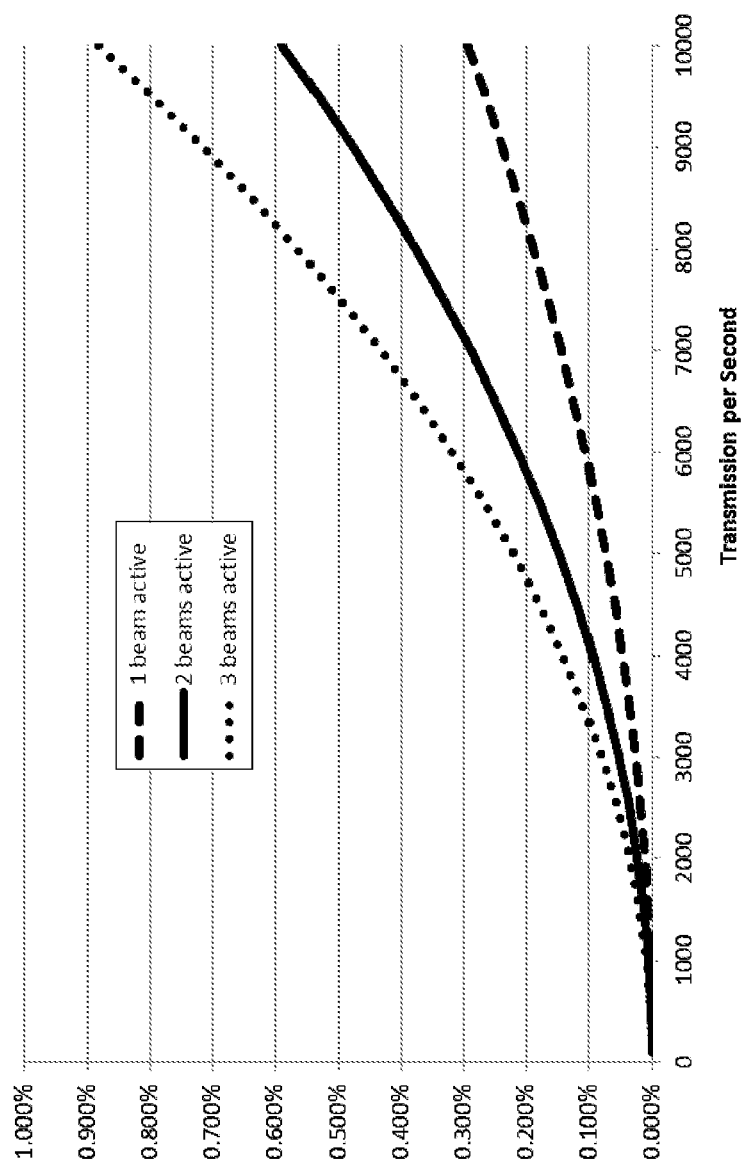

FIGS. 7A, 7B, and 8 include charts illustrating the probability of errors occurring according to an embodiment of the invention. As discussed in FIG. 5, in some embodiments, co-located transceivers may operate incorrectly and allow transmissions that should not occur. These conditions may cause message collisions. The 802.11 protocol may anticipate that these collisions may occur and may provide a procedure to recover from these collisions. The cost of collisions may be reduced throughput since data may need to be resent. Since embodiments of the invention may increase the number of collisions that would occur compared to a typical implementation of the 802.11 standard, experimentation may be required to show that the benefit of embodiments of the invention outweigh the increase in the number of collisions or jamming. The following discussion analyzes the probability of increased collisions based on embodiments of the invention.

Two mechanisms may increase the collisions, as discussed in scenario 505 and 506 of FIG. 5, and the most significant may be the self-jamming of preambles from marginally weak UE. As with all collisions, the number caused by some embodiments of the invention may increase as the data rate on a channel increases and thus a practical upper limit may be set on the amount of frames that can be sent. The results are shown graphically in FIGS. 7A and 7B.

With a practical upper limit of about 550 for DSSS mode (see FIG. 7A) and 3500 for OFDM mode (see FIG. 7B), the collisions added by embodiments of the invention may be 1.0% or less for DSSS and may be 0.5% or less for OFDM, with all beams operating at maximum speed. The real world impact may be less because the data in FIGS. 7A and 7B may assume that all UE have a marginal signal, while in real-world applications, many UEs may have a strong signal and may not cause collision. As with other examples, in other embodiments other times, percentages, and other constants may be used.

The analysis of the increase capacity co-located APs may be estimated to be directly related to the number of beams. With 4 beams replacing 1 beam, there may be in some embodiments approximately a 300% increase in capacity with the invention. However, without implementing embodiments of the invention which alter the 802.11 standard, there may be less than a 300% increase since only one AP beam would transmit at a time under the CSMA/CA rules.

For one mechanism in which collisions occur, preamble jamming, two preambles from a UE and a co-located transceiver may be within about 8 db of each other, and the transmitting transceiver will not recognize either. The transmitting transceiver may assume the channel is not currently active and may improperly allow transmission. In another mechanism, a preamble miss, the preamble may be missed entirely: The UE preamble may be very strong, may be properly decoded and a distinguishing element timing pulse is generated. If this UE generated timing pulse is within the time window that is used to recognize co-located AP transmissions, then the window will mistakenly assume the DE is from an associated MBAP. Consequently the MBAP receiver will assume the channel is not currently active and will improperly allow transmission.

To develop an upper bound on the probability of preamble jamming the following assumptions may be made:
  a. Assume a mode of operations where the other MBAPs are transmitting ($MBAP_{rate}$)
  b. Assume the MBAPs operations are all asynchronous and there are multiple beams ($Nr_{Beams}$)
  c. Assume that for every MBAP transmission there is an associated UE that will try to send an acknowledgement. ($N_{UE}$)
  d. Assume that the signal levels of all UE acknowledgements are within 8 db of MBAP leakage. (Note this is a very worst case assumption because only the UE near the edge of the coverage area will in fact be jammed.
  e. For 802.11a and 802.g EPA-OFDM preamble portion of interest is 16 μsec ($\Delta_{window}$)
  f. For 801.11b and 802.g EPA-DSSS preamble of interest is 144 μsec ($\Delta_{window}$)
  g. Prob. jammed=$\Delta_{window}$*Overlap*$MBAP_{rate}$*$Nr_{Beams}$*$N_{UE}$ FIGS. 7A and 7B illustrate graphs of these probabilities versus the frames per second. Note the maximum number of frames per second when the DSSS preamble is used is substantially lower than for the OFDM.

To develop an upper bound on the probability of UE preamble "miss", the following assumptions may be made:
  a. Assume a mode of operations where the other MBAPs are transmitting ($MBAP_{rate}$)
  b. Assume the MBAPs operations are all asynchronous and there are multiple beams ($Nr_{Beams}$)
  c. Assume that for every MBAP transmission there is an associated UE that will try to send an acknowledgement. ($N_{UE}$)
  d. For all versions of the 802.11 protocol the comparison window is 0.5 μsec ($\Delta_{window}$)
  e. Prob. jammed=$\Delta_{window}$*$MBAP_{rate}$*$Nr_{Beams}$*$N_{UE}$ FIG. 8 shows graphs of this probability versus the frames per second. Since the same window size is used for all versions of 801.11 only one graph is generated. Although the graph may show values up to 10,000, the practical upper limit may be lower. For the DSSS versions, it may be about 550 and for the OFDM version it may be about 3500.

FIG. 9 is a flowchart for a method according to an embodiment of the invention. In operation 902, a first and second transceiver co-located with each other and using the same communications resources may transmit data, such as to user equipment, according to a collision sense multiple access/collision avoidance (CSMA/CA) protocol. The first and second transceiver may communicate according to, for example, the IEEE 802.11 protocol, which uses the CSMA/CA rules. The CSMA/CA rules may require a CCA prior to transmitting data or a NAV timer update to provide a countdown to when a transceiver may begin transmitting. In operation 904, a device or a processor may identify data transmission from the co-located second transceiver. The processor may, for example, determine a time difference between when a signal preamble is sent and when it is received. The time difference may be compared to a predetermined time difference or window. In operation 906, the processor may allow data transmission from the first transceiver simultaneously or concurrently with data transmission from or by the second transceiver on one or the same frequency channel (e.g., the same or overlapping frequency spectrum). The processor may, for example, control or send signals to a transmitter in the first transceiver such that data is transmitted at the same time as data is transmitted by the second transceiver. Allowing simultaneous data transmission from the co-located first and second transceivers may ignore CSMA/CA rules which prevent or suppress simultaneous transmission.

Different embodiments are disclosed herein. Features of certain embodiments may be combined with features of other embodiments; thus certain embodiments may be combinations of features of multiple embodiments.

Embodiments of the invention may include an article such as a computer or processor readable non-transitory storage medium, such as for example a memory, a disk drive, or a USB flash memory device encoding, including or storing instructions, e.g., computer-executable instructions, which when executed by a processor or controller, cause the processor or controller to carry out methods disclosed herein.

In various embodiments, computational modules may be implemented by e.g., processors (e.g., a general purpose computer processor or central processing unit executing software), or digital signal processors (DSPs), or other circuitry. The baseband modem may be implanted, for example, as a DSP. A beamforming matrix can be calculated and implemented for example by software running on general purpose processor. Beamformers, gain controllers, switches, combiners, and phase shifters may be implemented, for example using RF circuitries.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus certain embodiments may be combinations of features of multiple embodiments.

What is claimed is:

1. A wireless communication system comprising:
 a first transceiver and second transceiver, each of the first transceiver and second transceiver co-located to each other and each configured to transmit data to at least one user equipment using the same communications resources, according to a collision sense multiple access/collision avoidance (CSMA/CA) protocol; and
 a processor to:
 identify data transmission sent from the second transceiver to the at least one user equipment by detecting a signal preamble from the second transceiver by measuring a time difference between when the second transceiver transmits the signal preamble and when the first transceiver receives the signal preamble, and
 allow data transmission from the first transceiver simultaneously with the data transmission sent from the second transceiver to the at least one user equipment, on one frequency.

2. The wireless communication system of claim 1, wherein the second transceiver is to transmit a timing strobe contemporaneously with transmitting the signal preamble to the first transceiver.

3. The wireless communication system of claim 1, wherein the processor is to compare the measured time difference with a predetermined time difference, and to identify data transmission from the second transceiver if the measured time difference is less than the predetermined time difference.

4. The wireless communication system of claim 1, wherein the processor is to detect a signal preamble received from the second transceiver by identifying a distinguishable element in the signal preamble.

5. A method of wireless communication, comprising:
 transmitting data, by a first transceiver and a second transceiver co-located to each other and using the same communications resources, according to a collision sense multiple access/collision avoidance (CSMA/CA) protocol;
 identifying data transmission sent from the second transceiver to at least one user equipment by detecting a signal preamble from the second transceiver by measuring a time difference between when the second transceiver transmits the signal preamble and when the first transceiver receives the signal preamble; and
 allowing data transmission from the first transceiver simultaneously with the data transmission sent from the second transceiver to the at least one user equipment on one frequency channel.

6. The method of claim 5, comprising compare the measured time difference with a predetermined time difference, and to identify data transmission from the second transceiver if the measured time difference is less than the predetermined time difference.

7. The method of claim 5, wherein detecting a signal preamble received from the second transceiver comprises identifying a distinguishable element in the signal preamble.

8. The method of claim 5, comprising transmitting, by the second transceiver, a timing strobe concurrent with the signal preamble to the first transceiver.

9. A wireless communication system comprising:
 a first transceiver and second transceiver, each of the first transceiver and second transceiver co-located to each other and each configured to transmit data to at least one user equipment using the same communications resources, according to a collision sense multiple access/collision avoidance (CSMA/CA) protocol; and
 a processor is to:
 identify data transmission sent from the second transceiver to the at least one user equipment by determining whether an address field sent in a generic data packet is included in a stored list of addresses, the list comprising addresses of transceivers co-located with the first transceiver, and allow data transmission from the first transceiver simultaneously with the data transmission sent from the second transceiver to the at least one user equipment, on one frequency.

10. The wireless communication system of claim 9, comprising suppressing an update to a Network Allocation Vector in the first transceiver.

11. A method of wireless communication comprising:
transmitting data, by a first transceiver and a second transceiver co-located to each other and using the same communications resources, according to a collision sense multiple access/collision avoidance (CSMA/CA) protocol;
identifying data transmission sent from the second transceiver to at least one user equipment by determining whether an address field sent in a generic data packet is included in a stored list of addresses, the list comprising addresses of transceivers co-located with the first transceiver; and
allowing data transmission from the first transceiver simultaneously with the data transmission sent from the second transceiver to the at least one user equipment on one frequency channel.

12. An access point device, comprising:
a transmitter to transmit data according to a collision sense multiple access/collision avoidance (CSMA/CA) protocol;
a receiver to receive and identify data from a co-located access point; and
a processor to detect a signal preamble received from the co-located access point, determine a time difference between when the co-located access point transmitted the signal preamble and when the receiver received the signal preamble and to control the transmitter to transmit data to a user equipment simultaneously with data transmission by the co-located access point.

13. The access point device of claim 12, wherein the receiver is to receive a timing strobe from the co-located access point that is concurrent with the signal preamble.

14. An access point device comprising:
a transmitter to transmit data according to a collision sense multiple access/collision avoidance (CSMA/CA) protocol;
a receiver to receive and identify data from a co-located access point;
a processor to control the transmitter to transmit data to a user equipment simultaneously with data transmission by the co-located access point; and
a memory to store an address list of co-located access points, wherein the processor is to compare an address received in a generic data packet with the stored address list.

* * * * *